(12) United States Patent
Aso et al.

(10) Patent No.: US 8,518,521 B2
(45) Date of Patent: Aug. 27, 2013

(54) COMPOSITE MOLDED ARTICLE

(75) Inventors: Toshihiro Aso, Aichi-gun (JP); Akira Uchimi, Anjo (JP); Yasuhiro Kume, Anjo (JP); Toshiyuki Tsuruga, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/501,973

(22) PCT Filed: Sep. 16, 2010

(86) PCT No.: PCT/JP2010/005659
§ 371 (c)(1),
(2), (4) Date: Apr. 13, 2012

(87) PCT Pub. No.: WO2011/045895
PCT Pub. Date: Apr. 21, 2011

(65) Prior Publication Data
US 2012/0207982 A1   Aug. 16, 2012

(30) Foreign Application Priority Data

Oct. 16, 2009   (JP) .................................. 2009-239152

(51) Int. Cl.
*B32B 3/30* (2006.01)
(52) U.S. Cl.
USPC ............. 428/164; 428/98; 428/141; 428/544; 428/612
(58) Field of Classification Search
USPC ......................................... 428/164, 141, 612
See application file for complete search history.

(56) References Cited

U.S. PATENT DOCUMENTS

| 5,147,711 A | 9/1992 | Shurter |
| 2008/0003446 A1* | 1/2008 | Furukawa et al. ............ 428/612 |
| 2009/0252978 A1 | 10/2009 | Katayama et al. |
| 2009/0280296 A1 | 11/2009 | Naritomi et al. |
| 2011/0008644 A1* | 1/2011 | Naritomi et al. ............. 428/612 |

FOREIGN PATENT DOCUMENTS

| EP | 1 880 841 A2 | 1/2008 |
| FR | 2 682 167 | 4/1993 |
| JP | 61 144339 | 7/1986 |
| JP | 1 166956 | 6/1989 |

(Continued)

OTHER PUBLICATIONS

International Search Report Issued Jan. 11, 2011 in PCT/JP10/05659 Filed Sep. 16, 2010.

(Continued)

*Primary Examiner* — Maria Veronica Ewald
*Assistant Examiner* — Brian Handville
(74) *Attorney, Agent, or Firm* — Oblon, Spivak, McClelland, Maier & Neustadt, L.L.P.

(57) ABSTRACT

Provided is a composite molded article which can increase resistance to peeling at an interface and suppress excessive peeling of a fiber-reinforced polymer material portion even when thermal shock is repeatedly applied. The composite molded article comprises a metal member using metal as a base material and having a surface; and a fiber-reinforced polymer material portion coated on at least part of the surface of the metal member and having a polymer material as a matrix and a plurality of reinforcing fibers for reinforcing the matrix. The surface of the metal member has a plurality of projections juxtaposed regularly or randomly at a pitch distance greater than diameters of the reinforcing fibers. The respective facing projections form enterable spaces which part of the matrix enters and at least part of the reinforcing fibers can enter.

16 Claims, 16 Drawing Sheets

(56) References Cited

FOREIGN PATENT DOCUMENTS

| | | |
|---|---|---|
| JP | 3 278587 | 12/1991 |
| JP | 5 169589 | 7/1993 |
| JP | 6 55572 | 3/1994 |
| JP | 7-256651 | 10/1995 |
| JP | 10 305523 | 11/1998 |
| JP | 2000 141403 | 5/2000 |
| JP | 2000 160392 | 6/2000 |
| JP | 2001-3146 | 1/2001 |
| JP | 2001 225352 | 8/2001 |
| JP | 2007 301972 | 11/2007 |
| JP | 2009 61648 | 3/2009 |
| JP | 2009 114279 | 5/2009 |
| WO | 2007 029440 | 3/2007 |
| WO | 2007 072603 | 6/2007 |
| WO | 2009 031632 | 3/2009 |
| WO | WO2009116484 * | 3/2009 |
| WO | 2009 078466 | 6/2009 |

OTHER PUBLICATIONS

The Extended European Search Report issued Jun. 19, 2012, in Application No. / Patent No. 10823164.8-1217.

* cited by examiner

COMPOSITE MOLDED ARTICLE

TECHNICAL FIELD

The present invention relates to a composite molded article having a structure in which a surface of a metal member is coated with a fiber-reinforced polymer material portion.

BACKGROUND ART

Conventionally known is a composite molded article comprising a metal member using metal as a base material and having a surface, and a resin portion coated on the surface of the metal member (PTL 1 to PTL 3). According to PTL 1, a composite molded article is formed by applying chemical etching to a surface of a metal member and then forming a resin portion by inserting the metal member and injection molding a thermoplastic resin in order to coat the etched surface with the resin. This literature states that even if a thermal cycle is repeated, the composite molded article can secure high airtightness. PTL 2 discloses a composite molded article formed by applying chemical conversion treatment to a surface of a metal member formed of a magnesium alloy to form a surface layer comprising metal oxide, metal carbonate, or metal phosphate, and then coating concavities and convexities of the surface layer with a resin layer containing polybutylene terephthalate resin or polyphenylene sulfide resin as a main component. In this article, a number of cylinders having a diameter of about 10 nm and a length of about 100 nm are formed on the surface layer. PTL 3 discloses a joining method in which, while a metal member formed of a metal material and a resin material are overlapped, the resin material located at a joint portion is heated to 200 to 1500 deg. C. by using a laser beam, thereby generating air bubbles in the resin material at the joint portion. The air bubbles have sizes of 0.01 to 5.0 mm. This literature states that this joining method can increase joining strength of the metal member and the resin material.

[PTL 1] Japanese Unexamined Patent Publication No. 2001-225352
[PTL 2] Japanese Unexamined Patent Publication No. 2007-301972
[PTL 3] International Publication No. WO 2007/029440

SUMMARY OF INVENTION

Technical Problem

The abovementioned composite molded articles can increase shear strength of an interface between the surface of the metal member and the resin portion coated on the surface of the metal member as much as possible, and can suppress peeling of the resin portion. However, when the composite molded articles are used in a severe use environment such as those in which a severe thermal cycle is repeatedly applied, the abovementioned composite molded articles cannot always sufficiently endure such a severe environment and there is a risk that the resin portion is excessively peeled off. For example, in a severe environment typically exemplified by engine compartments of vehicles, a severe thermal cycle is repeatedly applied on a composite molded article. Therefore, the composite molded article cannot sufficiently endure such a severe environment and when the composite molded article is used in such a severe environment for a long time, there is a risk that the resin portion is excessively peeled off.

The present invention has been made in view of the above-mentioned circumstances. It is an object of the present invention to provide a composite molded article which can increase resistance to peeling at an interface between a surface of a metal member and a fiber-reinforced polymer material portion coated on the surface of the metal member as much as possible, and can suppress excessive peeling of the fiber-reinforced polymer material portion even when severe thermal shock due to heating and cooling is repeatedly applied to the composite molded article.

Solution to Problem

A composite molded article according to a first aspect of the present invention comprises (i) a metal member using metal as abase material and having a surface; and (ii) a fiber-reinforced polymer material portion coated on at least part of the surface of the metal member and having a polymer material as a matrix and a plurality of reinforcing fibers for reinforcing the matrix; (iii) the surface of the metal member has a plurality of projections juxtaposed regularly or randomly at a pitch distance greater than diameters of the reinforcing fibers, and (iv) the respective facing projections form enterable spaces which part of the polymer material constituting the fiber-reinforced polymer material portion enters and at least part of the reinforcing fiber can enter.

According to the present invention, a plurality of projections formed on the surface of the metal member are juxtaposed regularly or randomly at a pitch distance greater than diameters of the reinforcing fibers. Therefore, distortion caused by shear stress generated at an interface between the metal member and the fiber-reinforced polymer material portion can be segmented by the projections. Consequently, even when the composite molded article is used in a severe environment in which thermal shock is repeatedly applied, peeling at the interface can be suppressed. Moreover, part of the polymer material constituting the matrix of the fiber-reinforced polymer material portion enters the enterable spaces. This can further increase shear strength of the interface between the surface of the metal member and the fiber-reinforced polymer material portion. Furthermore, at least part of the reinforcing fibers can enter the enterable spaces formed by the respective facing projections, and this is advantageous in reinforcing the polymer material entered in the enterable spaces with the reinforcing fibers. This can further increase the above-mentioned shear strength of the interface.

By the way, when attention is paid to the interface between the surface of the metal member and the fiber-reinforced polymer material portion, there is a low probability that the reinforcing fibers in themselves are present in the interface. It is believed that there is a high probability that a thin layer formed of a polymer material constituting the fiber-reinforced polymer material portion is present in the interface. The thin layer will also be referred to as a WBL (weak boundary layer) below. Herein, the thin layer is formed of a polymer material and there is a low probability that the reinforcing fibers are present in the thin layer. Therefore, the thin layer is believed to be poor in mechanical strength when compared to the fiber-reinforced polymer material portion in itself. In this case, when force such as thermal shock is applied to the interface, there is a possibility that the thin layer is broken by stress concentration. If at least part of the reinforcing fibers enter the enterable spaces located between the respective facing projections as mentioned before, it is believed that shear strength of the interface can be increased by reinforcement effect of the reinforcing fibers even if the thin layer is present.

In the composite molded article according to a second aspect of the present invention, wall surfaces forming the projections have a plurality of micro concave portions and/or micro convex portions exposed to the enterable spaces.

Furthermore, according to the second aspect of the present invention, wall surfaces forming the projections have a plurality of micro concave portions and/or micro convex portions exposed to the enterable spaces. The micro concave portions have micro openings which are smaller in size than openings of the enterable spaces. The micro convex portions have projection amounts which are smaller in size than the openings of the enterable spaces. Owing to the micro concave portions and/or micro convex portions formed on the wall surfaces of the projections, degree of engagement at the interface between the metal member and the fiber-reinforced polymer material portion is further increased and shear strength of the polymer material entered in the abovementioned enterable spaces can be further increased, and resistance to peeling at the interface is improved.

Advantageous Effects of Invention

As mentioned above, according to the present invention, distortion caused by shear stress at the interface of the metal member and the fiber-reinforced polymer material portion can be segmented by the projections. Therefore, durability to shear failure at the interface can be enhanced and peeling at the interface can be suppressed. Therefore, even when the composite molded article is used in an environment in which thermal shock due to heating and cooling is repeatedly applied for a long time, excessive peeling at the interface can be suppressed.

BEST MODES FOR CARRYING OUT THE INVENTION

Figure 18:
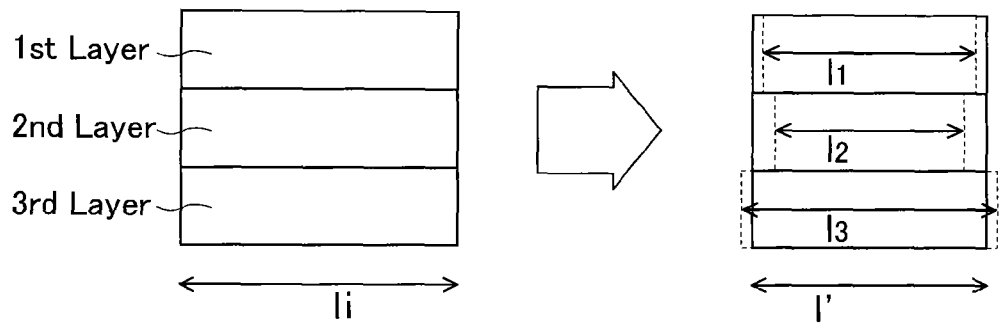
FIG. 18 is a view schematically showing how a three-layered body changes by thermal expansion.

Segmentation of distortion caused by shear stress generated at an interface will be described with an example of a three-layered body (initial length: $l_i$) of the present invention shown in FIG. 18. A first layer (x=1) is a resin layer, a third layer (x=3) is a metal member, and a second layer (x=2) as an intermediate layer is a WBL. When this layered body is subjected to a temperature change $\Delta T$, the respective layers (x=1 to 3) try to make dimensional changes $\Delta l_x$ (x=1 to 3) expressed by Formula 1 and become $l_x$ (x=1 to 3). That is to say, for the first layer (x=1), basically $\Delta l_1 = l_i \beta_1 \Delta T$. For the second layer (x=2), basically $\Delta l_2 = l_i \beta_2 \Delta T$. For the third layer (x=3), basically $\Delta l_3 = l_i \beta_3 \Delta T$. Therefore, for length $l_1$ of the first layer (x=1), basically $l_1 = l_i + \Delta l_1$. For length $l_2$ of the second layer (x=2), basically $l_2 = l_i + \Delta l_2$. For length $l_3$ of the third layer (x=3), basically $l_3 = l_i + \Delta l_3$.

However, since boundary surfaces of the respective layers (x=1 to 3) are joined with each other, the respective layers cannot freely slide. Hence, when a temperature change $\Delta T$ occurs, an actual length of the three-layered body becomes l'. A difference between l' and $l_x$ remains as distortion in the respective layers. It is believed that when shear stress generated by the distortion exceeds shear strength of the materials, a crack occurs and grows.

At l', tensile force and compressive force generated by distortion of the respective layers are supposed to be balanced. Hence a balance of forces is basically expressed by Formula 2, and an average size l' of the three-layered body can be calculated. Shear stress $\tau_x$ of the respective layers caused by a distortion amount $\Delta l_x$ ($\Delta l_c = l' - l_x$) corresponding to the dimensional change has a relation with thickness $d_x$ of the respective layers and is believed to be calculated by Formula 3.

It is believed that when shear stress $\tau_2$ calculated by Formula 3 exceeds shear strength of the WBL as the second layer, a crack occurs in the WBL. It goes without saying that in this case, stress caused by a linear expansion difference between the first layer and the third layer has to be considered, but distortion is also generated by linear expansion of the WBL in itself and shear stress is generated. Therefore, a micro crack occurs in the WBL depending on how boundary surfaces are joined. Hence, it is believed that the crack grows due to thermal impact caused by repetition of a thermal cycle and leads to breaking down of the WBL.

[Math. 1]

$$\Delta l_x = l_i \beta_x \Delta T \qquad \text{Formula 1}$$

where $l_i$: initial length, $\beta_x$: linear expansion coefficient of the x layer,
$\Delta T$: temperature change

[Math. 2]

$$A_1 E_1 (l' - l_1) + A_2 E_2 (l' - l_2) + A_3 E_3 (l' - l_3) = 0 \qquad \text{Formula 2}$$

$$l' = \frac{A_1 E_1 l_1 + A_2 E_2 l_2 + A_3 E_3 l_3}{A_1 E_1 + A_2 E_2 + A_3 E_3}$$

where $A_x$: cross-sectional area of the x layer,
$E_x$: modulus of longitudinal elasticity (Young's modulus) of the x layer

[Math. 3]

$$\gamma_x = \Delta l_x / d_x = \tau_x / G_x$$

$$\tau_x = \Delta l_x \times G_x / d_x \qquad \text{Formula 3}$$

where $\gamma_x$: shear distortion of the x layer,
$G_x$: modulus of transverse elasticity (modulus of rigidity) of the x layer,
$\tau_x$: shear stress of the x layer, $d_x$: thickness of the x layer It should be noted that since the WBL and the like are sometimes subjected to chemical degradation typified by hydrolysis caused by penetration of water, oxidation, alkali and so on, and stress cracking caused by an organic solvent, lowering of mechanical characteristics of the WBL is further promoted, and as a result, there is a risk that a smaller shear stress leads to breaking of the WBL. It is believed that once the WBL is broken, peeling off of the first layer from the second layer proceeds. According to the above Formula 3, in order to reduce shear stress $\tau_2$ acting on the WBL, it is effective (i) to decrease distortion $\Delta l_2$ by segmentation, and (ii) to decrease modulus of transverse elasticity (modulus of rigidity) $G_2$ by decreasing rigidity of the polymer material. Therefore, the present inventors take (i) into consideration and have come up with an idea that it is effective to form a plurality of projections such as walls and stakes on the surface of the metal member regularly or randomly at a predetermined pitch distance or less. The present invention has thus been developed on the idea that distortion is segmented by a plurality of projections. Pitch distance between the respective facing projections can be calculated from Formula 3.

Further description will be given taking an example of composite molded articles formed by coating a metal member comprising an aluminum alloy with an FRP portion comprising a PPS resin reinforced with glass fibers. In this case, a relation between initial length $l_i$ (corresponding to pitch distance LA between the respective facing projections) and shear stress $\tau_2$ was calculated. The results are shown as the characteristic line WA in FIG. 19. In this case, one thermal cycle was between −40 deg. C. and 23 deg. C., the FRP portion had a thickness of 3 mm, the metal member had a thickness of 3 mm, and the WBL had a thickness of 10 nm. Physical properties used in the calculation are shown in Table 1.

TABLE 1

|  | LINEAR EXPANSION COEFFICIENT (/K) | MODULUS OF LONGITUDINAL ELASTICITY (MPa) | MODULUS OF TRNSVERSE ELASTICITY (Mpa) | SHEAR STRENGTH (MPa) | BREAKING ELONGATION (%) |
|---|---|---|---|---|---|
| ALUMINUM ALLOY | $2.37 \times 10^{-5}$ | 70000 | 27000 | — | — |
| FRP PORTION | $1.70 \times 10^{-5}$ | 10800 | 4100 | 190 | 2.2 |
| WBL (PPS RESIN) | $8.00 \times 10^{-5}$ | 3900 | 1500 | 85 | 30 |

* The FRP portion is a PPS resin containing glass fibers (glass fibers: 30% by mass)

Figure 19:
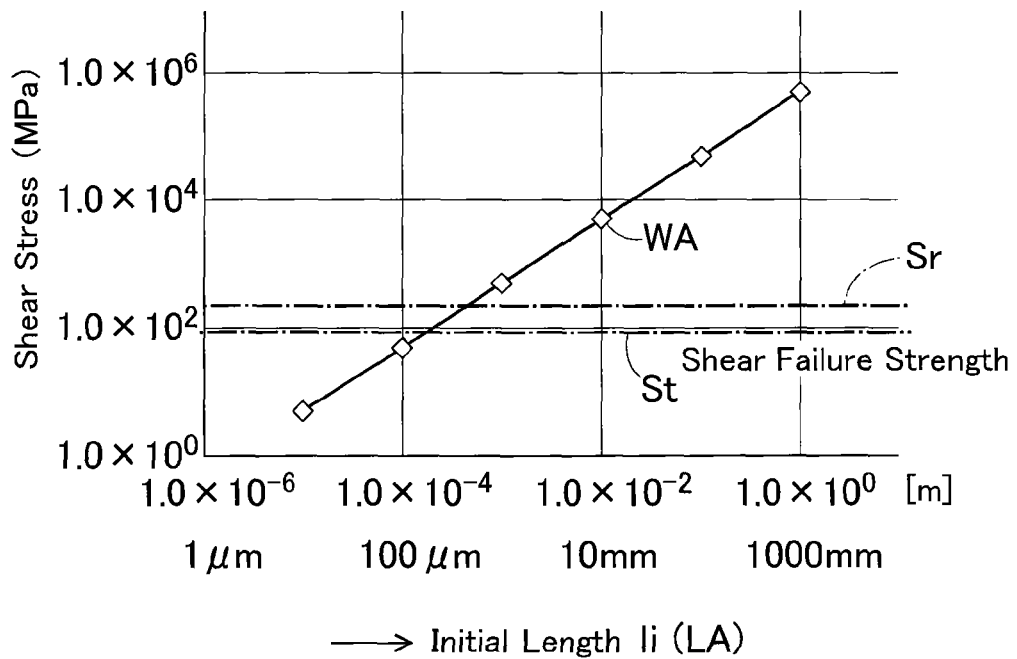
FIG. 19 is a graph showing a relation between shear stress acting on a WBL and pitch distance LA between projections.

In FIG. 19, shear stress of the PPS resin in itself is shown as the characteristic line St. It is believed that a region where shear stress is greater than the characteristic line St indicates a region where there is a risk that the WBL in itself located at the interface is broken, while a region where shear stress is smaller than the characteristic line St indicates a region where breaking of the WBL in itself located at the interface does not occur. According to the characteristic line WA of FIG. 19, when initial length $l_i$ between the respective facing projections (corresponding to pitch distance LA between the respective facing projections) is far greater than $1.0 \times 10^{-4}$ m=100 μm (for example, when initial length $l_i$ is greater than 3000 μm), it is believed that there is a risk that the WBL at the interface is broken and peeling at the interface is promoted. In contrast, according to the characteristic line WA of FIG. 19, in a case of the PPS resin, when initial length $l_i$ between the respective facing projections is not more than 100 μm, it is believed that breaking of the WBL located at the interface is inhibited and peeling at the interface does not occur. Accordingly, when an aluminum alloy is used as the metal member and a PPS resin is used as a polymer material constituting the fiber-reinforced polymer material portion (the FRP portion), it is estimated from FIG. 19 that it can be a rough guide for prevention of interfacial peeling to set the pitch distance LA between the respective facing projections to not more than 100 μm. Moreover, when practical peel resistance of composite molded articles using the PPS resin is taken into consideration, it is believed that shear stress has to be lower than the characteristic line Sr of FIG. 19. In this case, the initial length $l_i$ between the respective facing projections (corresponding to the pitch distance LA between the respective facing projections) is far greater than 500 μm or 1000 μm, there is a high risk that the WEL located at the interface is broken. Of course, 100 μm or 1000 μm is just a rough guide and the pitch distance LA between the respective facing projections is appropriately adjusted in accordance with factors such as the material, rigidity, and thickness of the WBL, and it is believed possible to make it a rough guide to set the pitch distance LA between the projections to not more than 3000 μm. Thus, if rigidity of a polymer material is changed, of course the pitch distance LA is to be changed. It should be noted that the projections are connected with each other in a plan view taken in a perpendicular direction to the surface of the metal member.

By the way, according to the present invention, it is preferable that the enterable spaces and the projections are formed of an imprinted surface formed on the surface of the metal member. Examples of the imprinted surface include rolled surfaces (imprinted surfaces) formed by imprinting, on the surface of the metal member, concavities and/or convexities on die surfaces of form-rolling elements (imprinting elements) such as rotatable forming rollers and non-rotatable rolling dies. The forming rollers include knurled rollers. The imprinted surface can also be formed by clamping a forming die (an imprinting element) to press concavities and/or convexities formed on a forming surface of a forming die against the surface of the metal member. In some cases, the enterable spaces and the projections are formed of a surface blasted by making a group of blast media hit the surface of the metal member. Examples of blasting media constituting the group of blast media include shots, grids, and sand particles. Examples of the material of the blast media include metal and ceramics. The grids mean particles having a shape different from spherical or quasi-spherical shapes of shots and generally have a high grindability. It is also possible to use cut wire shots produced by cutting metal wire rod in a length direction thereof and having a generally cylindrical shape or a quasi-cylindrical shape. The cut wire shots have a high grindability with respect to the surface of the metal member.

According to the present invention, it is preferable that the metal constituting the metal member is at least one kind of aluminum, aluminum alloys, magnesium, magnesium alloys, iron, iron alloys, titanium, titanium alloys, copper, and copper alloys. The polymer material constituting the fiber-reinforced polymer material portion can be resin or rubber. The resin can be a thermoplastic resin or a thermosetting resin. Specifically, it is preferable that the polymer material is at least one kind of nylon (polyamide), polyimide, polyacetal, polyethylene terephthalate (PET), polybutylene terephthalate (PBT), polyphenylene sulfide (PPS), polyether sulfone (PES), polyether imide (PEI), polyphenylene ether (PPE), polysulfone, polyethylene, polystyrene, polypropylene, acrylic resin, vinyl chloride resin, fluorocarbon resin, polycarbonate, phenol resin, epoxy resin, unsaturated polyester resin, acrylonitrile butadiene styrene (ABS), acrylonitrile butadiene (AB), and liquid crystal polymer. It is also possible to employ a polymer material which contains at least one kind of these polymer materials as a main component.

The surface of the metal member has a plurality of juxtaposed projections. The projections are formed regularly or randomly at a pitch distance LA greater than diameters D of the reinforcing fibers so that the respective facing projections (closest facing projections) form enterable spaces. It is preferable that adjoining projections are connected with each other in a plan view taken in a perpendicular direction to the surface of the metal member. Then the projections are reinforced and suppressed from being broken. Since part of the polymer material constituting the fiber-reinforced polymer material portion enters the enterable spaces, it is advantageous in further enhancing joining strength at the interface. At least part of the reinforcing fibers can enter these enterable spaces. Therefore, the pitch distance LA between the projections is made greater than diameters D of the reinforcing fibers. Wall surfaces forming the projections have a plurality of micro concave portions and/or micro convex portions exposed to the enterable spaces. Each of the micro concave portions has a micro opening which is smaller in size than openings of the enterable spaces. Each of the micro convex portions has a projection amount which is smaller in size than the size of the openings of the enterable spaces. The micro concave portions and the micro convex portions can be formed, for example, by etching, form rolling, or die forming, and can also be formed by radiating a high-energy density beam such as a laser beam.

It is preferable that the reinforcing fibers constituting the fiber-reinforced polymer material portion are at least one kind of glass fibers, ceramic fibers, metal fibers, carbon fibers and high-strength polymer fibers. Examples of the ceramic fibers include at least one kind of alumina fibers, silica fibers, alumina-silica fibers, silicon nitride fibers, silicon carbon fibers, and zirconia fibers. Examples of the high-strength polymer fibers include ultrahigh-strength polyethylene fibers, ultrahigh-strength polyvinyl alcohol fibers, aramid fibers, and polyacetal fibers. Examples of the reinforcing fibers include short fibers (fiber length: for example, not more than 1 mm or not more than 2 mm), long fibers and whiskers. When an average fiber length K of the reinforcing fibers buried in the fiber-reinforced polymer material portion is smaller than the pitch distance LA, or close to the pitch distance LA (K/LA falls within a range of 0.5 to 2.0 or a range of 0.8 to 1.5), the reinforcing fibers can contribute to reinforcement of the polymer material in the enterable spaces by entering the enterable spaces.

The surface of the metal member has a plurality of projections juxtaposed regularly or randomly. LA is greater than the diameters D of the reinforcing fibers (LA>D), where LA is a pitch distance between the respective facing projections. The pitch distance LA is set in accordance with factors such as the kind (rigidity) of the polymer material, thickness of the WBL, and the diameters D of the reinforcing fibers, but can be exemplified by an arbitrary value within a range of 10 to 5000 μm, an arbitrary value within a range of 20 to 4000 μm, an arbitrary value within a range of 30 to 2000 μm, and an arbitrary value within a range of 40 to 1000 μm. Examples of an upper limit value of the pitch distance LA include 5000 μm, 4000 μm, 3000 μm, 1500 μm, 800 μm, 500 μm, and further include 400 μm, 300 μm, 200 μm, 150 μm, and 130 μm, in accordance with factors such as the kind of the polymer material and the diameters D of the reinforcing fibers. Examples of a lower limit value of the pitch distance LA include 10 μm, 30 μm, 50 μm, and 70 μm, in accordance with factors such as the kind (rigidity) of the polymer material, thickness of the WBL, and the diameters D of the reinforcing fibers.

A pitch distance LB at projection bases is set in accordance with factors such as the kind (rigidity) of the polymer material, thickness of the WBL and the diameters D of the reinforcing fibers, but can be exemplified by an arbitrary value within a range of 10 to 5000 μm, an arbitrary value within a range of 20 to 4000 μm, an arbitrary value within a range of 30 to 2000 μm, and an arbitrary value within a range of 40 to 1000. Examples of an upper limit value of the pitch distance LA include 4000 μm, 3000 μm, 1500 μm, 800 μm, 500 μm, and further include 400 μm, 300 μm, 200 μm, 150 μm, and 130 μm, in accordance with factors such as the kind of the polymer material and the diameters D of the reinforcing fibers. Examples of a lower limit value of the pitch distance LA include 10 μm, 30 μm, 50 μm and 70 μm, in accordance with factors such as the kind (rigidity) of the polymer material, thickness of the WBL, and the diameters D of the reinforcing fibers.

An opening size LC is set in accordance with factors such as the kind (rigidity) of the polymer material, thickness of the WBL, and the diameters D of the reinforcing fibers, but can be exemplified by an arbitrary value within a range of 10 to 5000 μm, an arbitrary value within a range of 20 to 4000 μm, an arbitrary value within a range of 30 to 2000 μm, and an arbitrary value within a range of 40 to 1000 μm. Examples of an upper limit value of the pitch distance LA include 5000 μm, 4000 μm, 3000 μm, 1500 μm, 800 μm, 500 μm, and further include 400 μm, 300 μm, 200 μm, 150 μm, and 130 μm, in accordance with factors such as the kind of the polymer material and the diameters D of the reinforcing fibers. Examples of a lower limit value of the pitch distance LA include 10 μm, 30 μm, 50 μm and 70 μm, in accordance with factors such as the kind (rigidity) of the polymer material, thickness of the WBL, and the diameters D of the reinforcing fibers.

In view of an increase of the abovementioned strength of the interface, the following is possible. That is to say, the pitch distance LA can be set to be $t_w \times (5$ to $100)$, $t_w \times (10$ to $50)$, or $t_w \times (20$ to $40)$, where $t_w$ is a thickness of the WBL. When HA is a height of the projections (corresponding to depth of the enterable spaces), the height HA can be set to be LA×(0.5 to 2), LA×(0.7 to 1.7), or LA×(1.0 to 1.5). The micro concave portions can have micro openings of not more than 10 μm, not more than 7 μm, not more than 5 μm, or not more than 3 μm.

First Embodiment

Figure 1:
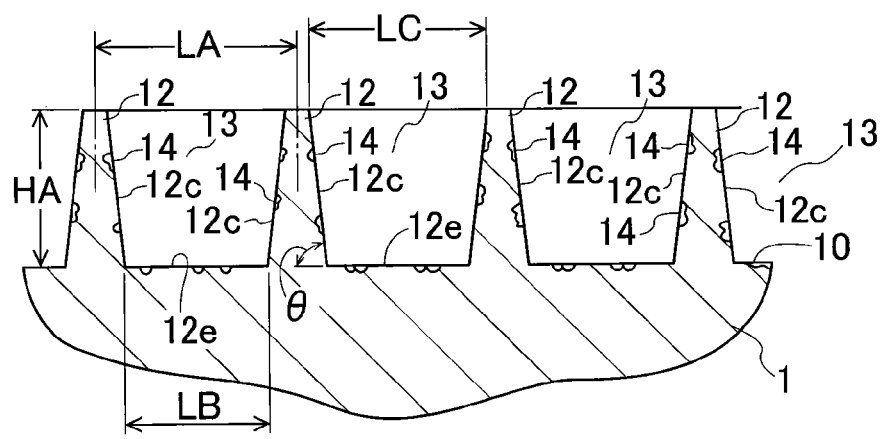
FIG. 1 is a cross-sectional view schematically showing projections cut along a thickness direction of a metal member according to a first embodiment.
Figure 2:
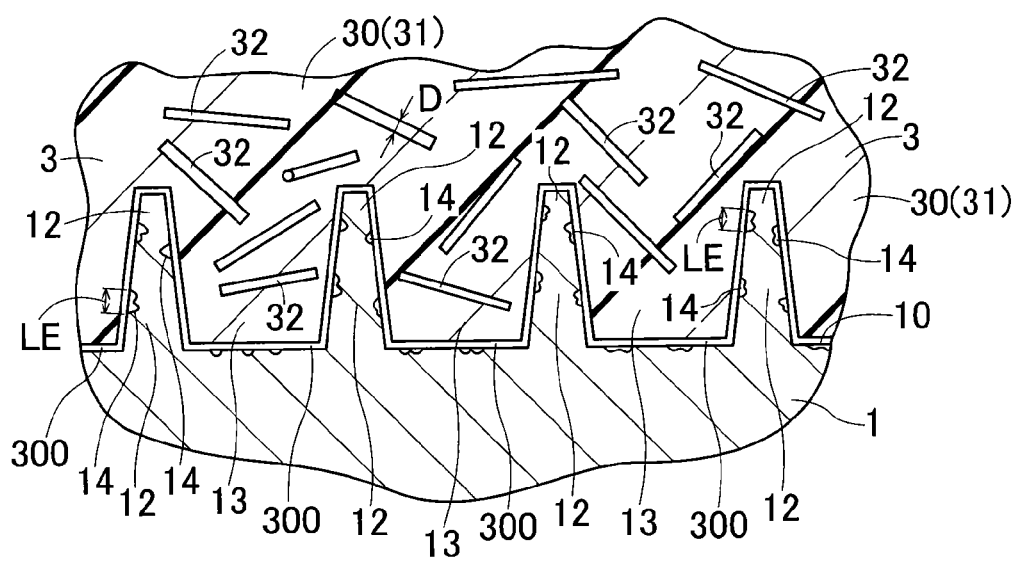
FIG. 2 is a cross-sectional view schematically showing that an FRP portion is coated on the projections on the metal member according to the first embodiment.

FIGS. 1 to 5 schematically show a concept of a first embodiment. FIG. 1 shows a cross section of a metal member 1 before coated with an FRP portion 3. FIG. 2 shows a cross section of the metal member 1 coated with the FRP portion 3. As shown in FIG. 2, a composite molded article comprises the metal member 1 having a surface 10 using an aluminum alloy or a magnesium alloy as a base material, and the FRP portion 3 (the fiber-reinforced polymer material portion) coated on the surface 10 of the metal member 1. The FRP portion 3 has a resin material 31 (a polymer material) as a matrix 30 and a plurality of reinforcing fibers 32 (e.g., glass fibers) for reinforcing the matrix 30. The surface 10 of the metal member 1 has a plurality of projections 12 juxtaposed regularly at a pitch distance LA (see FIG. 1) greater than diameters D of the reinforcing fibers 32. The pitch distance LA is set to be, for example, within a range of 40 to 500 μm, within a range of 50 to 300 μm, or within a range of 70 to 150 μm, in accordance with the kind of the matrix 30 constituting the FRP portion 3. Height HA of the projections 12 is set to be, for example, within a range of 50 to 200 μm, or within a range of 70 to 150 μm. Herein, a relation between LA and HA can be any one of LA=HA, LA≈HA, LA>HA, and LA<HA.

As shown in FIG. 1, wall surfaces 12c forming a projection 12 are back to back to each other and face wall surfaces 12c forming other adjoining and facing projections 12. The wall surfaces 12c are inclined at an inclination angle θ with respect to bottom surfaces 12e so as to get closer to each other in a direction toward tops of the projections 12 formed by the wall surfaces. Because each wall surface 12c is thus inclined, pitch distance LB at bases of the projections 12 (see FIG. 1) can be smaller than pitch distance LA at tops of the projections 12. This is advantageous in increasing segmentation of distortion at the interface. A plurality of micro concave portions 14 are formed at random on the wall surfaces 12c forming the projections 12 in a manner to face the enterable spaces 13. The micro concave portions 14 have micro opening sizes smaller than an opening size LC of the enterable spaces 13. The micro concave portions 14 can be formed by etching (wet etching) after form rolling. It is preferable to wash the metal member 1 after etching. When the metal member 1 is an aluminum alloy or the like, a surface oxide film at a micro level is often formed on the surface 10 of the metal member 1. When it can be expected to break such a surface oxide film of the metal member 1 by pressure application of form rolling, etching can be promoted.

When the metal member 1 is an aluminum alloy, an etching solution can contain, for example, OF-901 (produced by Ebara-Udylite Co., Ltd.), and magnesium hydroxide. The etching solution can use water as a solvent and contain not less than 10 g/liter of sulfuric acid and not less than 10 g/liter of ammonium fluoride. However, components and composition of the etching solution are not limited to these.

After the projections 12 and the micro concave portions 14 are formed on the metal member 1 as described above, the FRP portion 3 can be formed by injection molding with the metal member 1 inserted in a cavity of a forming die. For example, the injection molding conditions can be as follows: die temperature: 40 to 150 deg. C., cylinder temperature: 250 to 350 deg. C., injection pressure: 100 to 180 MPa, injection speed: 10 to 100 mm/sec. However, the injection molding conditions are not limited to these. After the injection, a pressure holding step was executed so as to keep applying pressure on a resin material charged in the cavity. This is advantageous in allowing the resin material to favorably enter the enterable spaces 13 between the projections 12 and the micro concave portions 14. In the pressure holding step, hold pressure was set at 40 to 80 MPa and pressure holding time was set to 10 to 15 seconds. It is preferable that thermal treatment is applied to the FRP portion 3 after the injection molding. This is expected to increase degree of crystallinity of the resin.

Figure 12:
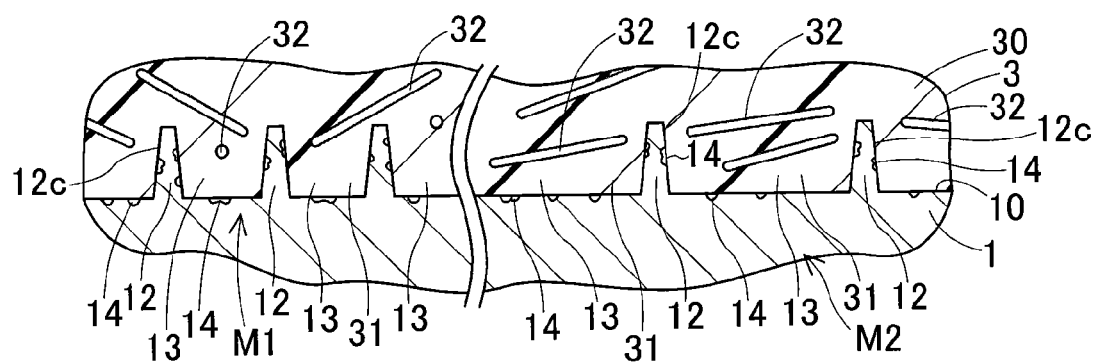
FIG. 12 is a cross-sectional view schematically showing that an FRP portion is coated on the projections on the surface of the metal member according to the seventh embodiment.

As shown in FIG. 1, the projections 12 respectively facing each other form enterable spaces 13. As shown in FIG. 12, part of the resin material 31 constituting the matrix 30 of the FRP portion 3 enter the enterable spaces 13 of the metal member 1 and at least part of the reinforcing fibers 32 enter the enterable spaces 13 of the metal member 1. This is expected to improve shear strength of an interface between the metal member 1 and the FRP portion 3.

The enterable spaces 13 and the projections 12 before etching are formed of a rolled surface 15 serving as an imprinted surface formed on the surface 10 of the metal member 1. Therefore, a plurality of projections 12 can be arbitrarily formed on the surface 10 of the metal member 1 so that the pitch distance LA of the projections 12 and the height HA of the projections 12 are as desired and at desired positions. Therefore, the pitch distance LA of all the projections 12 is made uniform. The wall surfaces 12c of the projections 12 have an inclination θ (see FIG. 1) with respect to the bottom surfaces 12e.

Figure 3:
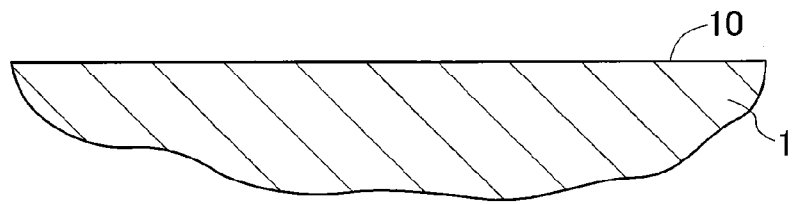
FIG. 3 is a cross-sectional view schematically showing a surface of the metal member before form rolling according to the first embodiment.
Figure 4:
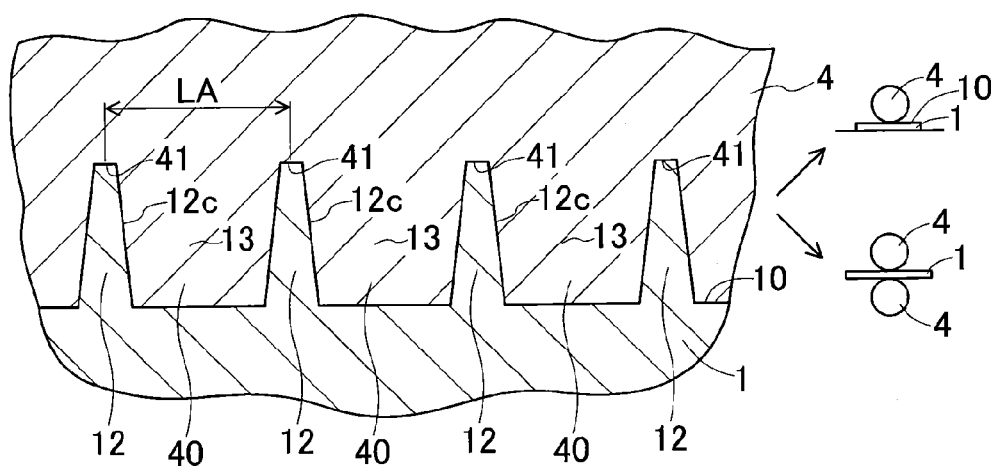
FIG. 4 is a cross-sectional view schematically showing that projections are formed while a surface of the metal member is form rolled according to the first embodiment.

A metal member 1 having a flat surface 10 shown in FIG. 3 is used for form rolling. As shown in FIG. 4, while one or more forming rollers 4 (an imprinting element) having annular form-rolling convexities 40 and annular form-rolling grooves 41 are rotated, the form-rolling convexities 40 and the form-rolling grooves 41 are imprinted on the surface 10 of the metal member 1. Thereby formed are the enterable spaces 13 and the projections 12. In this case, a single forming roller 4 can be pressed against the metal member 1 or a pair of forming rollers 4 (an imprinting element) can be employed to sandwich the metal member 1. The form rolling can be cold working in an ordinary temperature range, hot working in a hot state, or warm working in a warm state between the hot state and the cold state. When the form rolling is performed as cold working, it can be expected to strengthen and consolidate the projections 12 by work hardening. Since easy molding can be expected with warm working or hot working, the material of the metal member 1 can be hard.

According to the present embodiment, distortion caused by shear stress generated at an interface between the surface 10 of the metal member 1 and the FRP portion 3 can be segmented by the plurality of projections 12. This can improve durability to shear failure at the interface between the surface 10 of the metal member 1 and the FRP portion 3. Hence, even when thermal impact caused by heating and cooling is repeatedly applied to a composite molded article for a long time, peeling at the interface is suppressed and then peeling of the FRP portion 3 is suppressed. Moreover, according to the present embodiment, as shown in FIG. 2, the resin material 31 constituting the matrix 30 of the FRP portion 3 and part of the reinforcing fibers 32 enter the enterable spaces 13. This is advantageous in reinforcing the resin material 31 entered in the enterable spaces 13 with the reinforcing fibers 32. Therefore, this can further increase shear strength at the interface between the surface 10 of the metal member 1 and the FRP portion 3 and improve peel resistance.

Furthermore, the plurality of micro concave portions 14 are formed on the wall surfaces 12c forming the projections. The micro concave portions 14 face the enterable spaces 13 between the projections 12 and at the same time have micro openings having opening sizes LE (see FIG. 2) which are smaller than an opening size LC of the enterable spaces 13. This can further increase degree of engagement of the metal member 1 and the FRP portion 3, further increase the abovementioned shear strength of the interface and further improve peel resistance.

By the way, when attention is paid to the interface between the surface 10 of the metal member 1 and the FRP portion 3 coated on the surface 10 of the metal member 1, it is believed that there is a low probability that the reinforcing fibers 32 contained in the FRP portion 3 are located at the interface and that there is a high probability that a thin layer 300 formed only of the resin constituting the FRP portion 3 is present at the interface. Herein, the thin layer 300 is formed only of the resin and there is a low probability that the reinforcing fibers 32 are present in the thin layer 300. Therefore, the thin layer 300 is poor in mechanical strength when compared to the FRP portion 3 in itself, and there is a possibility that the thin layer 300 is broken by stress concentration when force such as thermal shock is applied. However, if at least part of the reinforcing fibers 32 enter the enterable spaces 13 formed between the respective facing projections 12 as mentioned above, it is believed that the abovementioned shear strength of the interface can be further enhanced.

Figure 5:
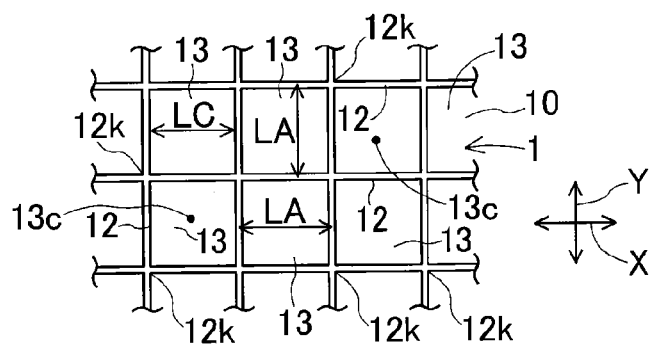
FIG. 5 is a plan view schematically showing the projections formed on the surface of the metal member according to the first embodiment.

FIG. 5 shows an example of a plan view of the surface 10 of the metal member 1. According to the plan view, the projections 12 are formed in the shape of cross stripe walls so as to be connected crisscross, i.e., in the x direction and in the y direction, which are perpendicular to each other. This is advantageous in increasing resistance to peeling in multiple directions. In the plan view, each of the enterable spaces 13 has a quadrangular (square, polygonal) shape. Since in the plan view, the projections 12 are continuously formed so as to encircle a center portion 13c of each enterable space 13, this is advantageous in reducing anisotropy of the center portion 13c of each enterable space 13. Hence, it is advantageous in reducing anisotropy of peeling. Since the projections 12 are connected so as to cross each other as shown in FIG. 5, the projections 12 have a plurality of intersectional portions 12k. The projections 12 are reinforced with the intersectional portions 12k. Hence even when shear stress is great or the projections 12 have a small thickness, fall or deformation of the projections is suppressed as much as possible. Therefore, an effect of segmenting distortion can be maintained for a long time. Especially when the form rolling is performed in a cold state, it can be expected to strengthen the projections 12 and the intersectional portions 12k by work hardening. However, it is possible to omit the intersectional portions 12k and make the respective projections 12 independent of each other.

It should be noted that according to the present embodiment, in some cases, when a sufficient peel resistance is obtained, it is possible to omit etching and form no micro concave portions 14 on the projections 12. Since distortion caused by shear stress at the interface can be segmented by the projections 12 even in this case, peel resistance of the FRP portion 3 can be enhanced.

Second Embodiment

Figure 6A:
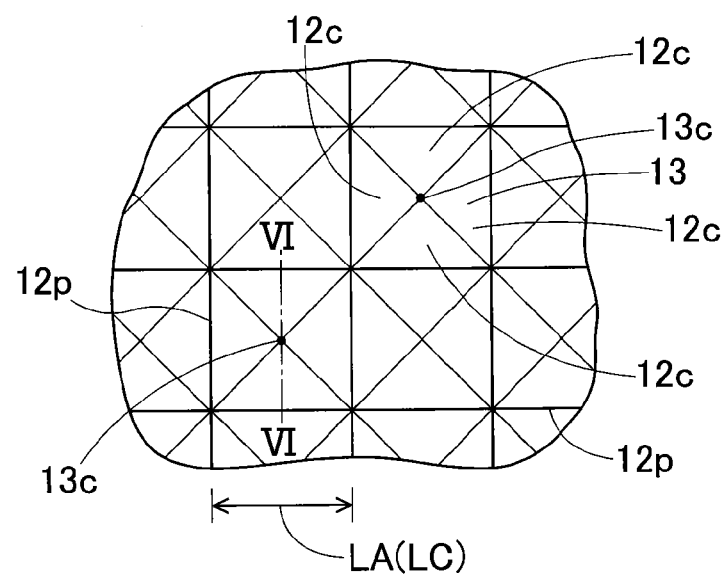
FIG. 6A is a plan view schematically showing enterable spaces formed on a surface of a metal member and FIG. 6B is a cross-sectional view (a cross-sectional view cut along the line VI-VI) schematically showing the enterable spaces formed on the surface of the metal member, both according to a second embodiment.
Figure 6B:
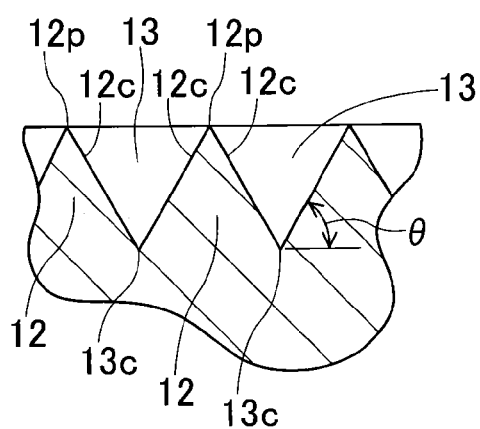

FIG. 6 shows a second embodiment. The present embodiment has basically similar construction, operation and effects to those of the first embodiment. Their differences will be mainly described below. FIG. 6A shows a plan view of a plurality of juxtaposed enterable spaces 13. FIG. 6B shows a cross section cut along the line VI-VI of FIG. 6A. The plurality of enterable spaces 13 formed by the projections 12 are arranged crisscross. Each of the enterable spaces 13 has a square pyramid shape. Therefore, convexities of a forming roller (an imprinting element) to constitute the enterable spaces 13 have the shape of a right square pyramid with an apex corresponding to a center portion 13c. The convexities securely have a high ability to intrude into the metal member 1. Wall surfaces 12c constituting the enterable spaces 13 have a triangular shape. The center portion 13c of a bottom portion is a deepest bottom portion of each enterable space 13 and corresponds to a position of an apex of each of the right square pyramid-shaped convexities of the abovementioned forming roller. It should be noted that LA=LC (LA ≈LB), LB=0 (LB≈0) and as shown in FIG. 6B, a top portion 12p of each of the projections 12 has a thickness of substantially zero. Thickness of each of the projections 12 increases toward the center portion 13c and entire strength of each of the projections 12 is secured.

Third Embodiment

Figure 7:
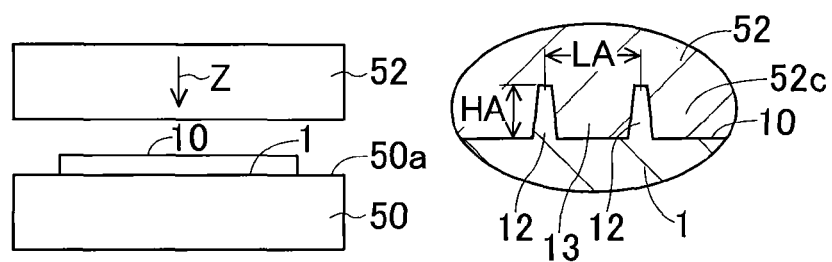
FIG. 7 is a view schematically showing that projections are imprinted on a surface of a metal member by pressing a forming die for imprinting according to a third embodiment.

FIG. 7 shows a third embodiment. The present embodiment has basically similar construction, operation and effects to those of the first embodiment. Their differences will be mainly described below. A metal member 1 is placed on a mounting surface 50a of a fixed die 50. In this state, a forming die 52 having an imprinting die portion 52c (an imprinting element) is lowered in one direction (a Z direction) and pressed against a surface 10 of the metal member 1. Then, the forming die 52 is raised so as to be separated from the fixed die 50. Thereby projections 12 and enterable spaces 13 are formed on the surface 10 of the metal member 1. Since pressure direction of the forming die 52 is one direction and separation direction of the forming die 52 is an opposite direction to the pressure direction, imprinting accuracy in forming the projections 12 is high. Molding processing can be any of cold working, hot working, and warm working. Also in the present embodiment it is preferable to form micro concave portions by etching. In some cases, however, etching can be omitted as long as a sufficient peel resistance is secured. Since distortion caused by shear stress at an interface is segmented by the projections 12 even in this case, peel resistance of the FRP portion 3 can be enhanced.

Fourth Embodiment

Figure 8:
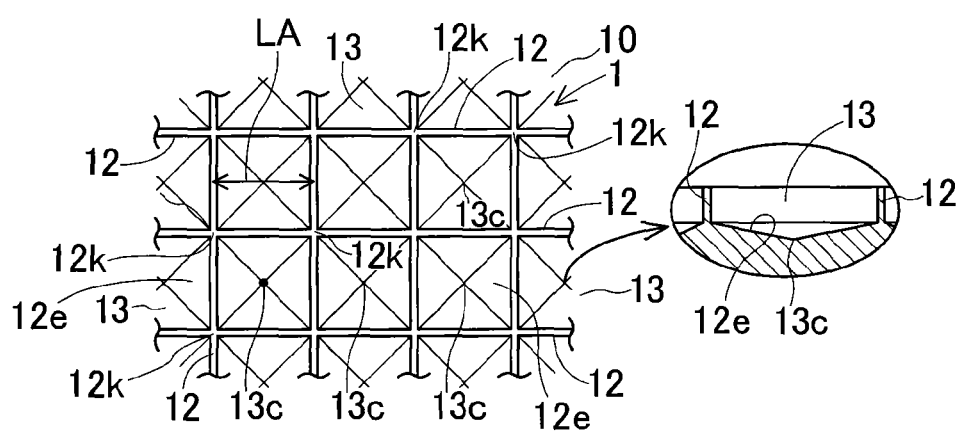
FIG. 8 is a plan view schematically showing projections formed on a surface of a metal member according to a forth embodiment.

FIG. 8 shows a fourth embodiment. This embodiment has basically similar construction, operation and effects to those of the first to third embodiments. Their differences will be mainly described below. FIG. 8 shows a plan view of projections 12 and enterable spaces 13 formed on a surface 10 of a metal member 1. The respective facing projections 12 are reinforced with intersectional portions 12k, so effect of segmenting distortion can be maintained for along time. Each of the enterable spaces 13 has a quadrangular (square) shape in a plan view. Besides, a center portion 13c of a bottom surface 12e of each of the enterable spaces 13 has a maximum depth. The depth decreases from the center portion 13c to the projections 12. Since the center portion 13c of each of the enterable spaces 13 has a maximum depth, reinforcing fibers 32 easily enter the center portion 13c of each of the enterable spaces 13. This is advantageous in reinforcing a resin material entered in the enterable spaces 13. Hence, this is advantageous in suppressing peeling at an interface between an FRP portion 3 and the surface 10 of the metal member 1. Also in the present embodiment, it is preferable to form a plurality of micro concave portions at random on the projections 12 by etching. In some cases, however, it is possible to omit etching and form no micro concave portions. Since distortion caused by shear stress at the interface is segmented by the projections 12 even in this case, peel resistance of the FRP portion 3 can be enhanced.

Fifth Embodiment

Figure 9:
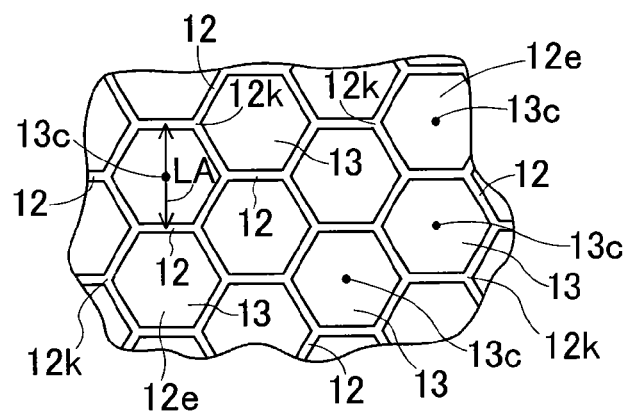
FIG. 9 is a plan view schematically showing projections formed on a surface of a metal member according to a fifth embodiment.

FIG. 9 shows a fifth embodiment. The present embodiment has basically similar construction, operation and effects to those of the first and second embodiments. Their differences will be mainly described below. FIG. 9 shows a plan view of projections 12 and enterable spaces 13 formed on a surface 10 of a metal member 1. Each of the enterable spaces 13 has a hexagonal (polygonal, regular polygonal) shape in a plan view. Since the projections 12 are continuously formed to encircle a center portion 13c of a bottom surface 12e of each of the enterable spaces 13, it is advantageous in reducing anisotropy to the center portion 13c of each of the enterable spaces 13. Hence, it is advantageous in reducing anisotropy of peeling. Each of the enterable spaces 13 can have a greatest depth at the center portion 13c or can have a uniform depth. Pitch distance LA between the projections 12 can be a greatest length between the projections 12. Also in the present embodiment, it is preferable to form micro concave portions on the projections 12 by etching. In some cases, however, it is possible to omit etching and form no micro concave portions.

Sixth Embodiment

Figure 10:
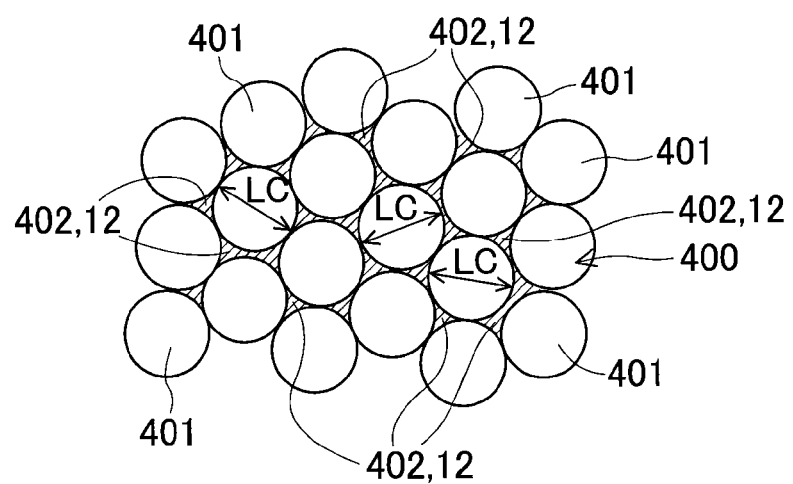
FIG. 10 is a plan view showing part of an imprinting element for forming projections according to a sixth embodiment.

FIG. 10 shows a sixth embodiment. The present embodiment has similar construction, operation and effects to those of the first and second embodiments. Their differences will be mainly described below. As shown in FIG. 10, an imprinting element 400 is formed by bundling a plurality of wire rods 401 having a circular cross section together in a group. Gaps 402 are formed between the respective facing wire rods 401. When the imprinting element 400 is firmly pressed against and thrust into a surface of a metal member approximately along a perpendicular direction, projections 12 are formed at positions corresponding to the gaps 402. The projections 12 are not connected with each other and are independent of each other and protrude from the surface of the metal member. As shown in FIG. 10, size LC of openings between the respective facing projections 12 corresponds to an outer diameter of the wire rods 401. LC or LA can be decreased by decreasing an outer diameter of the wire rods 401. Since the imprinting element 400 is formed by bundling the plurality of wire rods 401 together in a group, structure of the imprinting element 400 is simplified. Even when damaged, the imprinting element 400 can be repaired by replacing some of the wire rods 401. Also in the present embodiment, it is preferable to form micro concave portions on the projections 12 by etching. In some cases, however, it is possible to omit etching and form no micro concave portions.

Seventh Embodiment

Figure 11:
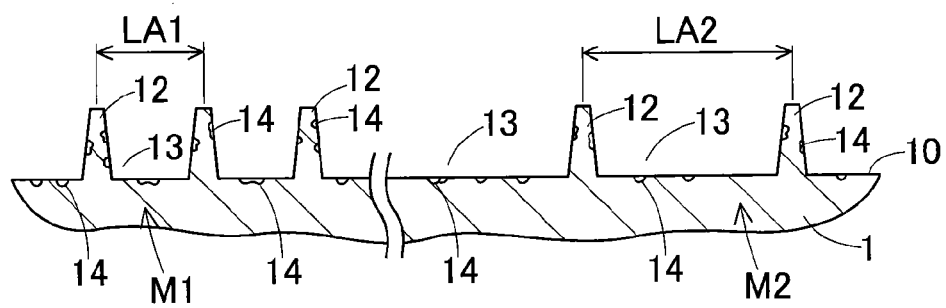
FIG. 11 is a cross-sectional view schematically showing projections formed on a surface of a metal member according to a seventh embodiment.

FIG. 11 and FIG. 12 show a seventh embodiment. The present embodiment has basically similar construction, operation and effects to those of the first and second embodiments. Their differences will be mainly described below. Enterable spaces 13 and projections 12 are formed as a rolled surface which serves as an imprinted surface formed on a surface 10 of a metal member 1 formed of an aluminum alloy. Pitch distance between the respective facing projections 12 is not uniform. Specifically, in a composite molded article, pitch distance LA2 is set to be relatively great in a region M2 where a relatively small thermal impact is applied. However, pitch distance LA1 is set to be relatively small in a region M1 where a relatively great thermal impact is applied. Therefore, distortion caused by shear stress due to thermal shock can be segmented and peeling at an interface can be suppressed. This is advantageous in the region M1 where the relatively great thermal shock is applied. Furthermore, wall surfaces 12c forming the projections 12 have a plurality of micro concave portions 14 exposed to the enterable spaces 13. This further increases degree of engagement at an interface between the surface 10 of the metal member 1 and an FRP portion 3. According to the present embodiment, similarly to the respective foregoing embodiments, even when thermal shock due to heating and cooling is repeatedly applied on a composite molded article for a long time, peeling of the FRP portion 3 can be further suppressed. Also in the present embodiment, it is preferable to form micro concave portions 14 on the projections 12 by etching. In some cases, however, it is possible to omit etching and form no micro concave portions 14.

Eighth Embodiment

FIG. 1 to FIG. 5 can be referred for an eighth embodiment. Also in the present embodiment, enterable spaces 13 and projections 12 are formed of a rolled surface formed on a surface 10 of a metal member 1 formed of an aluminum alloy. Also in the present embodiment, distortion caused by shear stress due to thermal shock can be segmented and peeling at an interface can be suppressed. LA is greater than (1.2 to 5)×HA or LA is greater than (2.0 to 4.0)×HA, and moreover LA is greater than K or D, where HA is a height of the projections 12, LA is a pitch distance, K is an average fiber length of reinforcing fibers 32 (e.g., glass fibers) buried in a matrix 30, and D is a diameter of the reinforcing fibers 32. In this case, not only a resin of the matrix 30 enters the enterable spaces 13 formed by the respective facing projections 12 but also the reinforcing fibers easily enter the enterable spaces 13. In this case, it is expected that shear strength of the interface is increased by glass fibers as much as possible. According to the present embodiment as described above, even when thermal shock due to heating and cooling is repeatedly applied on a composite molded article for a long time, peeling of the FRP portion 3 is further suppressed. Also in the present embodiment, it is preferable to form micro concave portions on the projections 12 by etching or the like. In some cases, however, it is possible to omit etching and form no micro concave portions.

Ninth Embodiment

Figure 13:
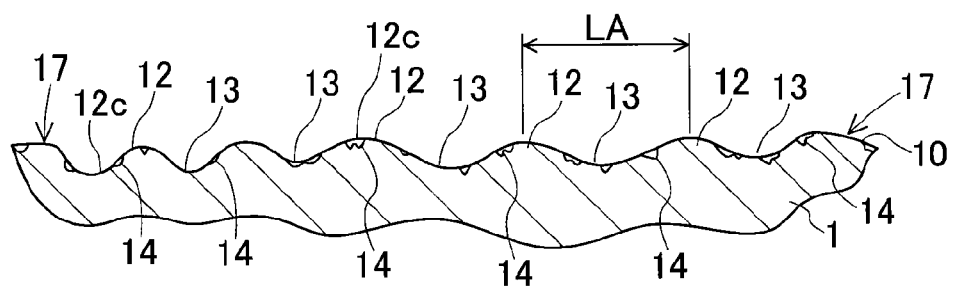
FIG. 13 is a cross-sectional view schematically showing projections formed on a surface of a metal member according to a ninth embodiment.
Figure 14:
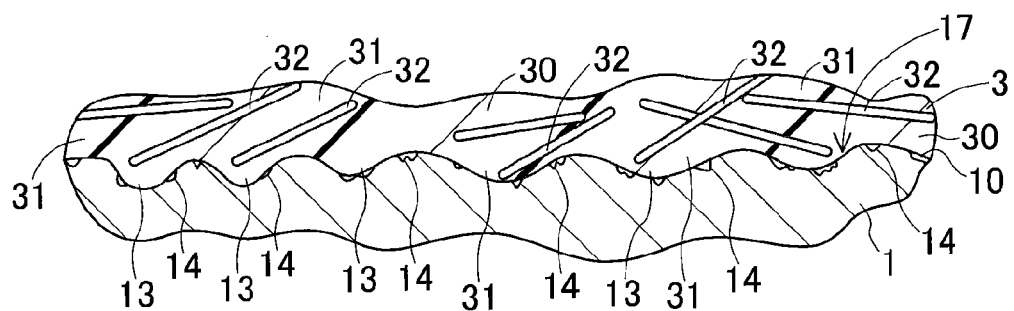
FIG. 14 is a cross-sectional view schematically showing that an FRP portion is coated on the projections on the surface of the metal member according to the ninth embodiment.

FIG. 13 and FIG. 14 schematically show a concept of a ninth embodiment. The present embodiment has basically similar construction, operation and effects to those of the first and second embodiments. Their differences will be mainly described below. Enterable spaces 13 and projections 12 are formed of a surface 17 blasted by making a group of blast media such as shots, grids and sand particles hit a surface 10 of a metal member 1 formed of an aluminum alloy. It is believed that in the surface 10 of the metal member 1, portions having relatively low hardness are chipped away to form the enterable spaces 13. It is believed that in the surface 10 of the metal member 1, portions having relatively high hardness or portions scarcely hit by the blast media form the projections 12. Pitch distance LA between the respective facing projections 12 is not uniform, but similarly to the above-mentioned respective embodiments, distortion caused by shear stress due to thermal shock can be segmented by the projections 12 and peeling at an interface can be suppressed. As shown in FIG. 14, part of a resin material 31 constituting a matrix 30 of an FRP portion 3 enters the enterable spaces 13 and part of reinforcing fibers 32 (glass fibers) enter the enterable spaces 13. This can enhance shear strength of the interface between the surface 10 of the metal member 1 and the FRP portion 3.

Furthermore, at least part of the reinforcing fibers 32 can enter the enterable spaces 13 located between the respective facing projections 12. This can reinforce the resin material 31 entered in the enterable spaces 13 and further enhance shear strength of the interface. Moreover, wall surfaces 12c forming the projections 12 have a plurality of micro concave portions 14 exposed to the enterable spaces 13. This further increases degree of engagement at the interface between the metal member 1 and the FRP portion 3 and further enhances the above-mentioned shear strength of the interface. According to the present embodiment, similarly to the abovementioned embodiments, even when thermal shock due to heating and cooling is repeatedly applied for a long time, peeling of the FRP portion 3 is further suppressed. Also in the present embodiment, it is preferable to form micro concave portions 14 are formed on the projections 12 by etching.

Since blasting and etching are employed in combination, portions having low hardness are chipped away by blasting and at the same time chemically easily solvable portions dissolve, shape of the projections 12 can be fabricated in a composite way. Moreover, blasting after etching has an adverse effect in that micro concave portions formed by etching are collapsed by blasting. However, according to the present embodiment, owing to blasting before etching, the abovementioned adverse effect can be suppressed and micro concave portions formed by etching are maintained in a good state. Moreover, when the metal member 1 is an aluminum alloy or the like, a surface oxide film at a micro level is often formed on the surface 10 of the metal member 1. It can be expected that a surface oxide film on the metal member 1 is removed owing to a cleaning effect or a grinding effect of blasting. In this case, since degree of exposure of a base material of the metal is increased, etching can be promoted. In some cases, however, it is possible to omit etching and forming no micro concave portions.

Tenth Embodiment

Figure 15:
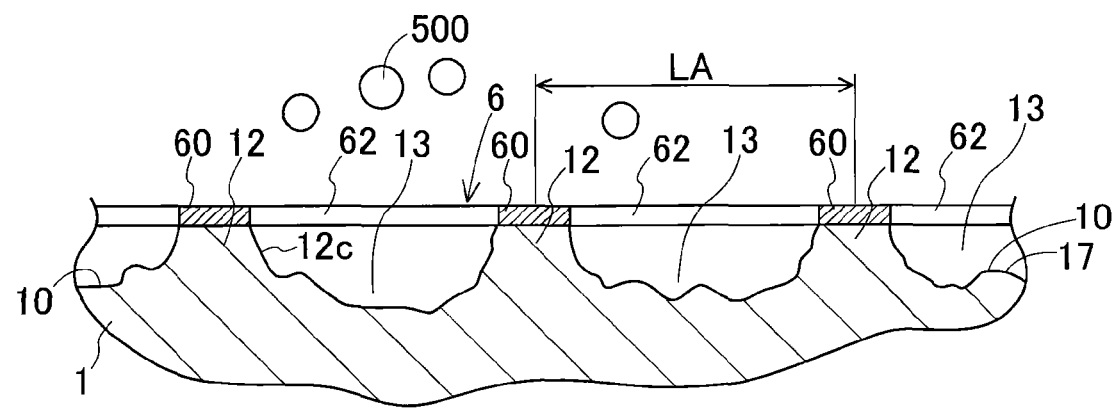
FIG. 15 is a cross-sectional view schematically showing that a surface of a metal member while covered with a masking member is subjected to blasting according to a tenth embodiment.
Figure 16:
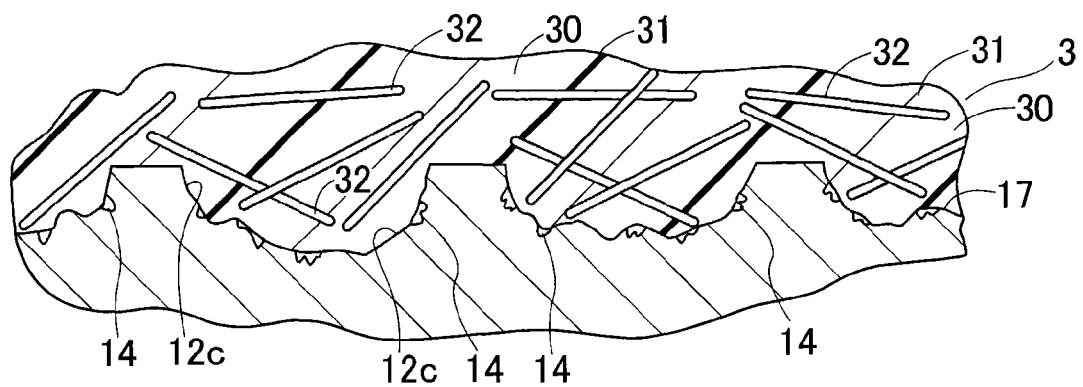
FIG. 16 is a cross-sectional view schematically showing that an FRP portion is coated on projections on the surface of the metal member according to the tenth embodiment.

FIG. 15 and FIG. 16 schematically show a concept of a tenth embodiment. The present embodiment has basically similar construction, operation and effects to those of the first and second embodiments. Their differences will be mainly described below. Enterable spaces 13 and projections 12 are formed of a surface 17 blasted by making a group of blast media 500 hit a surface 10 of a metal member 1 formed of metal such as an aluminum alloy. As shown in FIG. 15, a masking member 6 having masking portions 60 and opening portions 62 is employed in blasting. With the surface 10 of the metal member 1 covered with the masking member 6, a group of blast media 500 (of a size small enough to pass through the opening portions 62) is made to hit the surface 10 of the metal member 1 from the above. Portions facing the opening portions 62 permit collision with the blast media 500 such as shots, grids, and sands, and as a result are chipped away and form enterable spaces 13. Portions shielded with the masking portions 60 can limit collision with the blast media 500, and as result form projections 12. Preferably the masking member 6 is formed of a hard material (e.g., carbon steel, alloy steel, or ceramics). In this case, since pitch distance LA between the projections 12 approximately correspond to pitch distance of the masking portions 60 of the masking member 6, the pitch distance LA can be set as targeted. Therefore, the pitch distance LA between the projections 12 can be controlled by adjusting the pitch distance of the masking portions 60 of the masking member 6 in accordance with the material of the metal member, the material of the FRP portion 3 or the like. Especially the pitch distance LA between the projections 12 can be set as targeted by locating the masking member 6 in contact with or in the vicinity of the surface 10 of the metal member 1. Although it is blasting, blasting using the masking member 6 as mentioned above can have an effect of forming the projections 12 and enterable spaces 13 on the surface 10 of the metal member 1 regularly (regularly) and reproducibly. It should be noted that the masking member 6 can be formed by coating the metal member 1 with a soft material, such as a resist film, which can be abraded away by blasting. Since abrasion can be suppressed by the masking member 6 in the beginning and the middle of blasting also in this case, projections can be formed.

Also in the present embodiment, similarly to the abovementioned embodiments, distortion caused by thermal shock can be segmented by the projections 12 and peeling at an interface between the surface 10 of the metal member 1 and the FRP portion 3 can be suppressed. Part of the resin material 31 constituting the matrix 30 of the FRP portion 3 enters the enterable spaces 13 and part of the reinforcing fibers 32 enter the enterable spaces 13. Furthermore, wall surfaces 12c forming the projections 12 have a plurality of micro concave portions 14 exposed to the enterable spaces 13. This can further increase degree of engagement at the interface between the surface 10 of the metal member 1 and the FRP portion 3 and further increase the abovementioned shear strength of the interface. According to the present embodiment, similarly to the abovementioned embodiments, even when thermal shock due to heating and cooling is repeatedly applied on a composite molded article for a long time, peeling of the FRP portion 3 can be further suppressed. Also in the present embodiment, it is preferable to form micro concave portions 14 on the projections 12 by etching. In some cases, however, it is possible to omit etching and form no micro concave portions 14.

Eleventh Embodiment

Figure 17A:
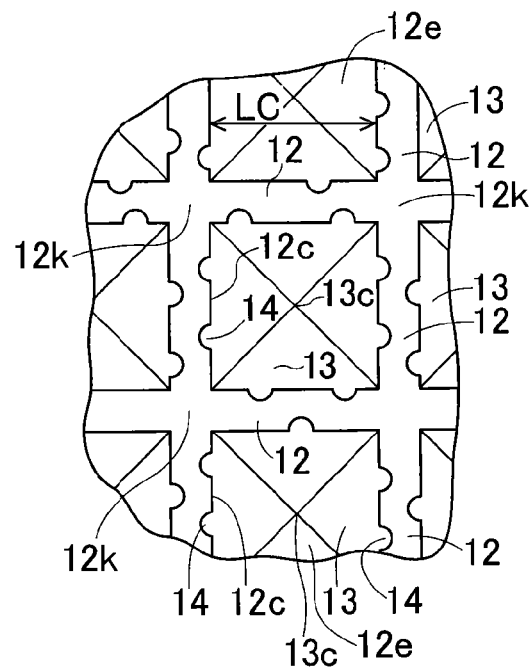
FIGS. 17A and 17B are plan views schematically showing projections formed on a surface of a metal member according to an eleventh embodiment.
Figure 17B:
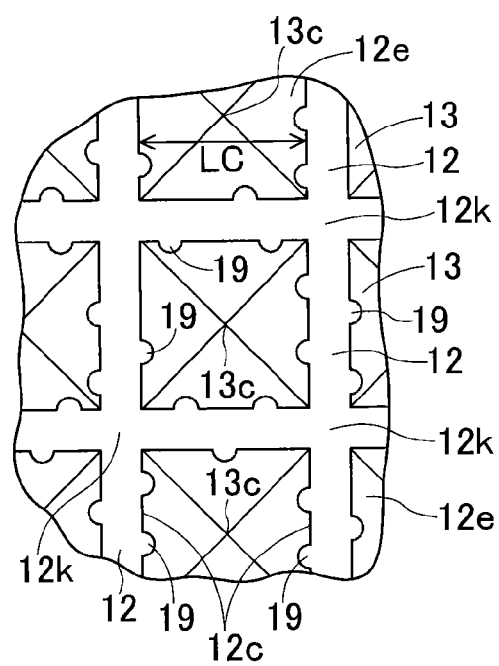

FIG. 17A and FIG. 17B schematically show a concept of an eleventh embodiment. The present embodiment has basically similar construction, operation and effects to those of the first and second embodiments. Their differences will be mainly described below. FIG. 17 show plan views of enterable spaces 13 and projections 12 before coated with an FRP portion. The enterable spaces 13 and the projections 12 are formed by pressing a forming roller or a forming surface of a forming die serving as an imprinting element. The projections 12 are formed in the shape of cross stripes. In FIG. 17A, a plurality of micro concave portions 14 are formed on wall surfaces 12c of the projections 12 so as to be exposed to the enterable spaces 13. The micro concave portions 14 have micro openings of sizes smaller than an opening size LC of the enterable spaces 13. In FIG. 17B, a plurality of micro convex portions 19 are formed on wall surfaces 12c of the projections 12 so as to face the enterable spaces 13. The micro convex portions 19 have projection amounts which are smaller than an opening size LC of the enterable spaces 13. Furthermore, the projection amounts of the micro convex portions are smaller than wall thickness at bases of the projections 12 forming the enterable spaces 13.

Since the micro concave portions 14 or the micro convex portions 19 can be formed simultaneously with formation of the projections 12 and the enterable spaces 13 by pressing a forming roller or a forming surface of a forming die, production steps can be simplified and omission of etching can be expected, which can contribute to cost reduction. Besides, if the micro concave portions 14 or the micro convex portions 19 are formed by cold working, it can also be expected to strengthen the projections 12 by work hardening. Herein, when the micro convex portions 14 are formed on the projections 12, there can be a risk of insufficient strength of the projections 12 due to a decrease in thickness of the projections 12. However, the projections 12 can be connected and strengthened owing to intersectional portions 12k which connect the projections 12 together. Therefore, peel resistance durability can be improved for a long time. In some cases, the projections 12 can be independent of each other without providing the intersectional portions 12k.

Also in the present embodiment, part of a matrix 30 constituting an FRP portion 3 enters the enterable spaces 13 and at the same time is engaged with the micro concave portions 14 or the micro convex portions 19. This further increase degree of engagement between the FRP portion 3 and the projections 12 of the metal member 1 and is advantageous in suppressing peeling of the FRP portion 3. Since the micro convex portions 19 protrude toward the respective facing projections 12, the micro convex portions 19 contribute to a decrease in pitch distance LA between the respective facing projections 12, and improves segmentation of distortion. Both the micro concave portions 14 and the micro convex portions 19 can be formed simultaneously on the wall surfaces 12c of the projections 12. Etching can be omitted in the present embodiment. In some cases, however, etching can also be employed.

Example 1

A plurality of projections 12 were formed by form rolling with a forming roller (material: cemented carbide) pressed against a surface 10 of a metal piece (corresponding to the metal member 1) comprising a flat plate (an extruded aluminum material, JIS A5052) of 25 mm in width, 100 mm in length, and 3 mm in thickness (see FIG. 1). Specifically, the projections 12 were formed by fixing the metal piece on a milling machine and using the forming roller as a cutter. Table feed speed was 75 mm/min, outer diameter of the forming roller was 20 mm, and depth of cut was 70 μm. The respective facing projections 12 formed enterable spaces 13. Pitch distance LA between top centers of adjoining projections 12 was 100 μm, depth HA was 67 μm, and inclination angle θ (see FIG. 1) was 60 deg.

Next, etching was performed to form fine pores (corresponding to the micro concave portions 14) on the surface 10 of the projections 12. Micro openings of the fine pores faced the enterable spaces 13. The micro openings had an opening size of about 3 μm and a depth of about 10 μm. In the etching, an etching solution used water as a solvent and contained 12 g/liter of OF-901 (produced by Ebara-Udylite Co., Ltd.), and 25 g/liter of magnesium hydroxide. Target temperature of the etching solution was 50 deg. C. and etching time was 10 minutes. Then, the metal piece was placed in a cavity of a die for injection molding. Then, a resin material comprising a PPS resin containing glass fibers was injected and molded in the cavity, thereby forming a specimen (see FIG. 20) comprising a composite molded article in which an FRP portion 3 having a thickness of 3 mm and the metal piece were integrated. An overlapped portion of the metal member and the FRP portion had a size of 25 mm×10 mm. For injection molding conditions, basically, die temperature was 130 deg. C., cylinder temperature was 320 deg. C., injection pressure was 100 MPa, injection speed was 60 mm/sec, injection time was 1 second, and screw rotation speed was 100 rpm. After the injection molding, a pressure holding step was executed in which pressure was kept applied on the resin material charged in the cavity. This is advantageous in allowing the resin material to enter the enterable spaces 13 between the projections 12 and the micro concave portions 14. In the pressure holding step, hold pressure was 50 MPa, and pressure holding time was 10 seconds.

Herein, the FRP portion 3 (glass fibers: 30% by mass, PPS: 70% by mass) corresponds to the fiber-reinforced polymer material portion. The metal piece corresponds to the metal member 1. Glass fibers mixed in the resin material before the injection molding were those having an average diameter of 13 μm and an average fiber length of 3 mm (produced by Nitto Boseki Co., Ltd.). It should be noted that glass fibers are sometimes shortened by break during injection molding. Measurement after molding showed that the glass fibers had an average length of 100

Example 2

The present example has basically similar construction, operation and effects to those of Example 1. A plurality of projections 12 were formed by form rolling on a surface 10 of a metal piece (corresponding to the metal member 1) comprising a flat plate of the same kind as that of Example 1 (an extruded aluminum material). However, pitch distance LA between tops of adjoining projections 12 was 200 μm, depth HA was 67 and inclination angle θ was 38 deg. Next, etching was performed to form fine pores (corresponding to the micro concave portions 14) on the surface 10 of the projections 12.

Micro openings of the fine pores faced enterable spaces 13. The micro openings had opening sizes of about 3 µm and depths of about 10 µm. Then, the metal piece was placed in a cavity of a die for injection molding. Then, similarly to Example 1, a resin material comprising a PPS resin containing glass fibers (glass fibers: 30% by mass) was injected and molded in the cavity, thereby forming a specimen (see FIG. 20) comprising a composite molded article in which an FRP portion 3 having a thickness of 3 mm and the metal piece were integrated. Injection molding conditions were similar to those of Example 1.

Example 3

The present example has basically similar construction, operation and effects to those of Example 1. A plurality of projections 12 were formed by form rolling on a surface 10 of a metal piece (corresponding to the metal member 1) comprising a flat plate of the same kind as that of Example 1 (an extruded aluminum material). However, pitch distance LA between tops of adjoining projections 12 was 200 µM, depth HA was 133 µm, and inclination angle θ was 60 deg. Next, etching was performed to form fine pores (corresponding to the micro concave portions 14) on the surface 10 of the projections 12. Their micro openings had opening sizes of about 3 µm and depths of about 10 µm. Then, the metal piece was placed in a cavity of a die for injection molding. Then, similarly to Example 1, a resin material comprising a PPS resin containing glass fibers (glass fibers: 30% by mass) was injected and molded in the cavity, thereby forming a specimen (see FIG. 20) comprising a composite molded article in which an FRP portion 3 having a thickness of 3 mm and the metal piece were integrated. Injection molding conditions were similar to those of Example 1.

Example 4

The present example has basically similar construction, operation and effects to those of Example 1. A rough surface was formed by blasting on a surface 10 of a metal piece (corresponding to the metal member 1) comprising a flat plate of the same kind as that of Example (an extruded aluminum material). For blasting conditions, shot diameter was 0.3 to 0.5 mm (indeterminate form), shot hardness was 40 to 50 HRC, and hitting speed was 80 m/sec. The rough surface after the blasting had an average roughness of 100 to 120 z (Rz). A plurality of projections 12 were irregularly and randomly juxtaposed on the rough surface. Pitch distance LA between tops of adjoining projections 12 was not less than 100 µm and depth HA was about 50 to 150 µm. Next, etching was performed to form fine pores (corresponding to the micro concave portions 14) on the surface 10 of the projections 12. Their micro openings had opening sizes of about 3 µm and depths of about 10 µm. Then, the metal piece was placed in a cavity of a die for injection molding. Then, similarly to Example 1, a resin material comprising a PPS resin containing glass fibers (glass fibers: 30% by mass) was injected and molded in the cavity, thereby forming a specimen (see FIG. 20) comprising a composite molded article in which an FRP portion 3 having a thickness of 3 mm and the metal piece were integrated. Injection molding conditions were similar to those of Example 1.

Example 5

The present example has basically similar construction, operation and effects to those of Example 1. A plurality of projections 12 were formed by form rolling on a surface 10 of a metal piece (corresponding to the metal member 1) comprising a flat plate of the same kind as that of Example 1 (an extruded aluminum material). However, pitch distance LA between tops of adjoining projections 12 was 100 µm, depth HA was 67 µm, and inclination angle θ was 60 deg. Next, etching was performed to form fine pores (corresponding to the micro concave portions 14) on the surface 10 of the projections 12. Their micro openings had opening sizes of about 3 µm and depths of about 10 µm. Next, the metal piece was heated on a hot plate to 300 deg. C. Then, a resin sheet comprising a PPS resin containing glass fibers (glass fibers: 30% by mass) was bonded with the metal piece under pressure and press-cooled by a press die. Thus formed was a specimen (see FIG. 20) comprising a composite molded article in which an FRP portion 3 having a thickness of 3 mm and the metal piece were integrated.

Example 6

The present example has basically similar construction, operation and effects to those of Example 1. A plurality of projections 12 were formed by form rolling on a surface 10 of a metal piece (corresponding to the metal member 1) comprising a flat plate of the same kind as that of Example 1 (an extruded aluminum material). However, pitch distance LA between tops of adjoining projections 12 was 200 µm, depth HA was 67 µm, and inclination angle θ was 38 deg. Next, etching was performed to form fine pores (corresponding to the micro concave portions 14) on the surface 10 of the projections 12. Their micro openings had opening sizes of about 3 µm and depths of about 10 µm. Next, the metal piece was heated on a hot plate to 300 deg. C. Then, a resin sheet comprising a PPS resin containing glass fibers (glass fibers: 30% by mass) was bonded with the metal piece under pressure and press-cooled by a press die. Thus formed was a specimen (see FIG. 20) comprising a composite molded article in which an FRP portion 3 having a thickness of 3 mm and the metal piece were integrated.

Example 7

The present example has basically similar construction, operation and effects to those of Example 1. A plurality of projections 12 were formed by form rolling on a surface 10 of a metal piece (corresponding to the metal member 1) comprising a flat plate of the same kind as that of Example 1 (an extruded aluminum material). However, pitch distance LA between tops of adjoining projections 12 was 200 µm, depth HA was 133 µm, and inclination angle θ was 60 deg. Next, etching was performed to form fine pores (corresponding to the micro concave portions 14) on the surface 10 of the projections 12. Their micro openings had opening sizes of about 3 µm and depths of about 10 µm. Next, the metal piece was heated on a hot plate to 300 deg. C. Then, a resin sheet comprising a PPS resin containing glass fibers (glass fibers: 30% by mass) was bonded with the metal piece under pressure and press-cooled by a press die. Thus formed was a specimen (see FIG. 20) comprising a composite molded article in which an FRP portion 3 having a thickness of 3 mm and the metal piece were integrated.

Example 8

The present example has basically similar construction, operation and effects to those of Example 1. A rough surface was formed by blasting on a surface 10 of a metal piece (corresponding to the metal member 1) comprising a flat plate of the same kind as that of Example 1 (an extruded aluminum material). The rough surface had an average roughness of 100 to 120 z (Rz). A plurality of projections 12 were irregularly juxtaposed on the rough surface. Pitch distance LA between tops of adjoining projections 12 was basically not less than 100 μm and depth HA was basically about 50 to 150 μm. Next, etching was performed to form fine pores (corresponding to the micro concave portions 14) on the surface 10 of the projections 12. Their micro openings had opening sizes of about 3 μm and depths of about 10 μm. Next, the metal piece was heated on a hot plate to 300 deg. C. Then, a resin sheet comprising a PPS resin containing glass fibers (glass fibers: 30% by mass) was bonded with the metal piece under pressure and press-cooled by a press die. Thus formed was a specimen (see FIG. 20) comprising a composite molded article in which an FRP portion 3 having a thickness of 3 mm and the metal piece were integrated.

Comparative Example 1

In Comparative Example 1, no projections were formed. Fine pores were formed by etching on a surface of a metal piece (corresponding to the metal member 1) comprising a flat plate of the same kind as that of Example 1 (an extruded aluminum material). Micro openings of the fine pores had opening sizes of about 3 μm and depths of about 10 μm. The surface of the metal piece was not subjected to form rolling or blasting. Then, the metal piece was placed in a cavity of a die for injection molding and a resin material comprising a PPS resin containing glass fibers (glass fibers: 30% by mass) was injected and molded in the cavity, thereby forming a specimen (see FIG. 20) comprising a composite molded article in which an FRP portion 3 having a thickness of 3 mm and the metal piece were integrated. Injection molding conditions were similar to those of Example 1.

Comparative Example 2

In Comparative Example 1, no projections were formed. Fine pores were formed by etching on a surface of a metal piece (corresponding to the metal member 1) comprising a flat plate of the same kind as that of Example 1 (an extruded aluminum material). Micro openings of the fine pores had opening sizes of about 3 μm and depths of about 10 μm. The surface of the metal piece was not subjected to form rolling or blasting. Then, the metal piece was heated on a hot plate to 300 deg. C. Then, a resin sheet comprising a PPS resin containing glass fibers (glass fibers: 30% by mass) was bonded with the metal piece under pressure and press-cooled by a press die. Thereby formed was a specimen (see FIG. 20) comprising a composite molded article in which an FRP portion 3 having a thickness of 3 mm and the metal piece were integrated.

Evaluation Test

Figure 20:
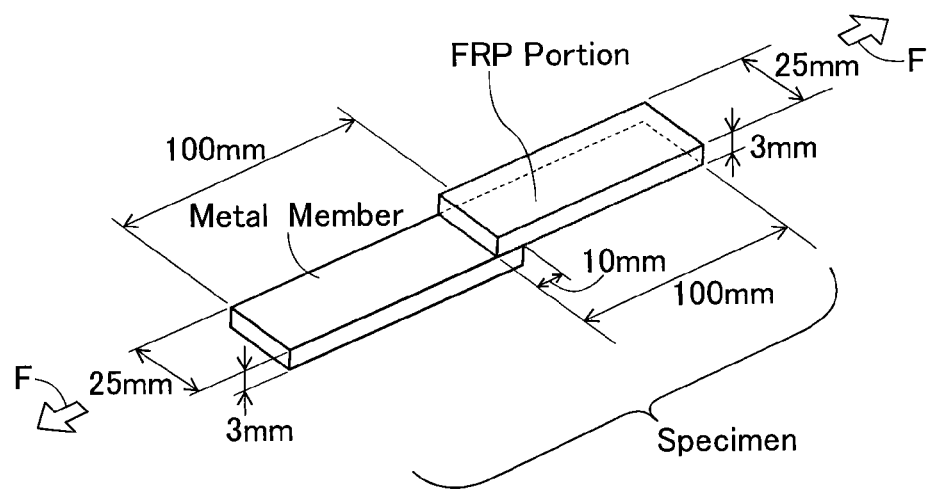
FIG. 20 is a perspective view of a specimen.

Initial shear strength of an interface of each of the specimens of the examples and the comparative examples (see FIG. 20) was obtained by pulling the specimen in the direction of F in FIG. 20 (a longitudinal direction) in order to apply shear force to the interface of the specimen. Shear strength after the thermal shock of each of the specimens of the examples and the comparative examples was obtained after thermal shock was repeatedly applied on the specimen by repeating a thermal cycle. One thermal cycle consisted of one hour duration at 150 deg. C. and one hour duration at −40 deg. C., and 100 cycles were executed. Test results are shown in Table 2.

TABLE 2

| | SHEAR STRENGTH (MPa) | | | | | | | | | |
|---|---|---|---|---|---|---|---|---|---|---|
| | EX. | | | | | | | | COMP. EX. | |
| | 1 | 2 | 3 | 4 | 5 | 6 | 7 | 8 | 1 | 2 |
| INITIAL SHEAR STRENGTH (MPa) | 30 | 30 | 30 | 30 | 30 | 30 | 30 | 30 | 29 | 29 |
| SHEAR STRENGTH AFTER THERMAL SHOCK (MPa) | 30 | 23 | 30 | 29 | 30 | 19 | 30 | 27 | 17 | 15 |

It means not peeling at the interface between the metal member 1 and the FRP portion 3 of the specimen but break of the FRP portion 3 in itself that a specimen had a shear strength of 30 MPa. Therefore, as can be understood from Table 2, in Examples 1 to 8, initial shear strength of the interface was good, so peeling did not occur at the interface between the metal member 1 and the FRP portion 3, and the FRP portion 3 in itself was broken. After thermal shock was repeatedly applied, in Examples 1, 3, 5, 7, shear strength of the interface was good, so peeling did not occur at the interface between the metal member 1 and the FRP portion 3, and the FRP portion 3 in itself was broken. In Example 2, the interface was broken and shear strength of the interface was 23 MPa, which was good. In Example 4, the interface was broken and shear strength of the interface was 29 MPa, which was good. In Example 6, the interface was broken and shear strength of the interface was 19 MPa, which was good. In Example 8, the interface was broken and shear strength of the interface was 27 MPa, which was good. In Comparative Examples 1 to 4, shear strength after thermal shock was low.

Figure 21:
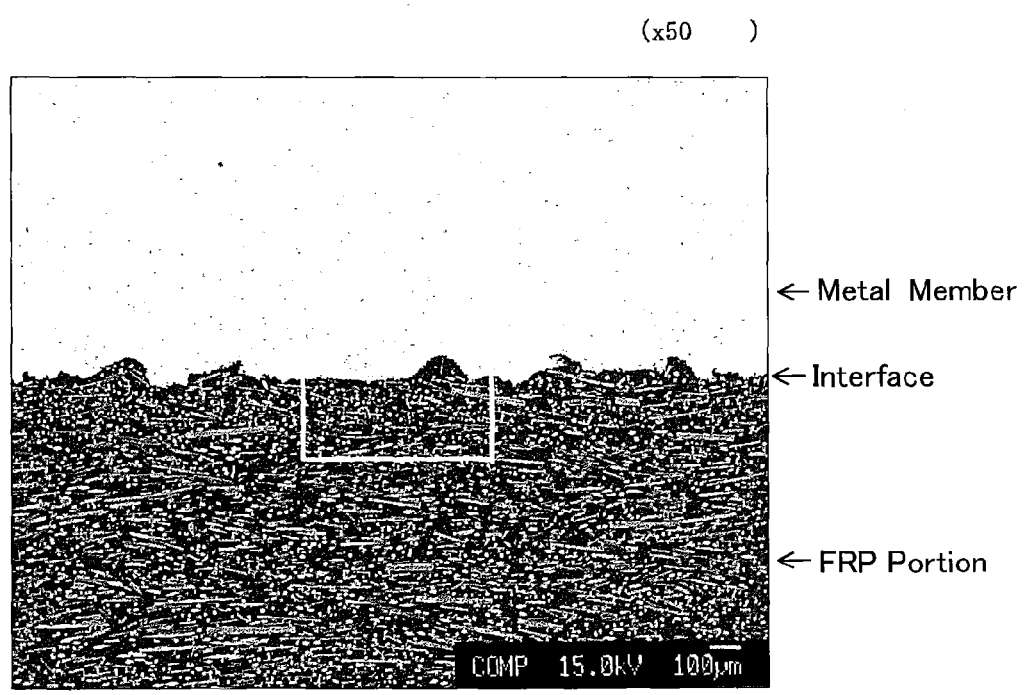
FIG. 21 is a photograph at a magnification of 50 times taken by a scanning electron microscope.
Figure 22:
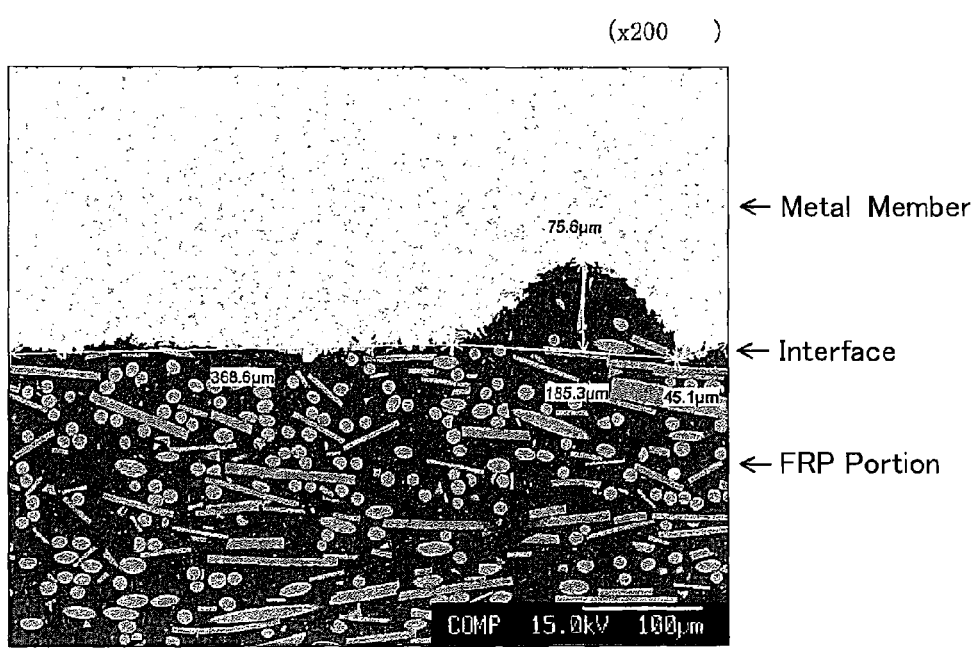
FIG. 22 is an enlarged photograph at a magnification of 200 times taken by a scanning electron microscope.

FIG. 21 shows a photograph of the interface of the specimen of Example 8 (after subjected to blasting and etching), taken by an electron scanning microscope. FIG. 22 shows an enlarged view of an area boxed with white line in FIG. 21. As shown in FIG. 21 and FIG. 22, the enterable spaces between the projections were charged with the resin material of the FRP portion, and at the same time the glass fibers entered the enterable spaces between the projections. Average pitch distance LA between the respective facing projections is believed to be about 100 to 300 μm.

Example 1B

A plurality of projections 12 were formed by pressing a die (material: cemented carbide) against a surface 10 of a metal piece (corresponding to the metal member 1) comprising a flat plate (an extruded aluminum material, JIS A5052) of 25 mm in width, 50 mm in length and 3 mm in thickness (see FIG. 1). The die had pyramid-shaped convexities having a pitch between tops of 100 μM and a depth of 67 μm. Using this die, the projections 12 were formed on the surface 10 of the metal piece (corresponding to the metal member 1). Pitch distance LA between top centers of adjoining projections 12 was 100 μm, depth HA was 50 μm and inclination angle θ was 60 deg. Herein, enterable spaces 13 were formed by the respective facing projections 12. Next, etching was performed to form fine pores (corresponding to the micro concave portions 14) on the surface 10 of the projections 12. Micro openings of the fine pores faced the enterable spaces 13. The micro openings had opening sizes of not more than 3

μm (about 200 nm at minimum) and a depth of about not more than 10 μm (about 200 nm at minimum). For etching, similarly to Example 1, an etching solution used water as a solvent and contained 12 g/liter of OF-901 (produced by Ebara-Udylite Co., Ltd.) and 25 g/liter of magnesium hydroxide. Target temperature of the etching solution was 50 deg. C. and etching time was 10 minutes.

Figure 23:
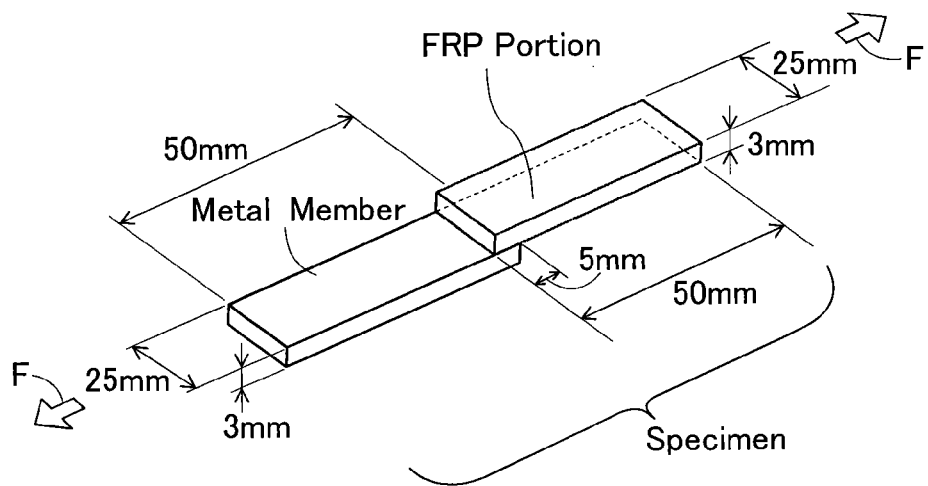
FIG. 23 is a perspective view of a specimen.

Then, the metal piece was placed in a cavity of a die for injection molding. Then, a resin material comprising nylon containing glass fibers was injected and molded in the cavity, thereby forming a specimen (see FIG. 23) comprising a composite molded article in which an FRP portion 3 having a thickness of 3 mm and the metal piece were integrated. An overlapping portion of the metal member and the FRP portion had a size of 5 mm×25 mm. For injection molding conditions, basically die temperature was 130 deg. C., cylinder temperature was 320 deg. C., injection pressure was 100 MPa, injection speed was 60 mm/sec., injection time was 1 second, and screw rotation speed was 100 rpm. After injection molding, a pressure holding step was executed so as to keep applying pressure on the resin material charged in the cavity. This is advantageous in allowing the resin material to favorably enter the enterable spaces 13 between the projections 12 and the micro concave portions 14. In the pressure holding step, hold pressure was 50 MPa and pressure holding time was 10 seconds.

Herein, the FRP portion 3 (glass fibers: 30% by mass) corresponds to the fiber-reinforced polymer material portion. The metal piece corresponds to the metal member 1. The glass fibers mixed in the resin material before injection molding was those having an average diameter of 13 μm and an average fiber length of 3 mm (produced by Nitto Boseki Co., Ltd.). It should be noted that glass fibers are sometimes shortened by break during injection molding. Measurement after molding showed that the glass fibers had an average length of 100 μm. After the injection molding, the specimen was subjected to a thermal treatment in a high temperature bath at 120 deg. C. for 24 hours and then subjected to an evaluation test mentioned later.

Example 2B

Example 2B is basically similar to Example 1B. However, a die (material: cemented carbide) pressed against a surface 10 of a metal piece (corresponding to the metal member 1) had pyramid-shaped convexities having a pitch between tops of 200 μm and a depth of 133 μm. By using this die, a plurality of projections 12 were formed on the surface 10 of the metal piece (corresponding to the metal member 1). Pitch distance LA between top centers of adjoining projections 12 was 200 μm, depth HA was 100 μm, and inclination angle θ (see FIG. 1) was 60 deg. Then, fine pores (corresponding to the micro concave portions 14) were formed on the surface 10 of the projections 12 by etching. Then, a resin material comprising nylon containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 3B

Example 3B is basically similar to Example 1B. However, a die (material: cemented carbide) pressed against a surface 10 of a metal piece (corresponding to the metal member 1) had pyramid-shaped convexities having a pitch between tops of 300 μm and a depth of 200 μm. By using this die, a plurality of projections 12 were formed on the surface 10 of the metal piece (corresponding to the metal member 1). Pitch distance LA between top centers of adjoining projections 12 was 300 μm, depth HA was 160 μm and inclination angle θ (see FIG. 1) was 60 deg. Then, fine pores (corresponding to the micro concave portions 14) were formed on the surface 10 of the projections 12 by etching. Then, a resin material comprising nylon containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 4B

Example 4B is basically similar to Example 1B. However, a die (material: cemented carbide) pressed against a surface 10 of a metal piece (corresponding to the metal member 1) had pyramid-shaped convexities having a pitch between tops of 600 μm and a depth of 400 μm. By using this die, a plurality of projections 12 were formed on the surface 10 of the metal piece (corresponding to the metal member 1). Pitch distance LA between top centers of adjoining projections 12 was 600 μm, depth HA was 300 μm and inclination angle θ (see FIG. 1) was 60 deg. Then, fine pores (corresponding to the micro concave portions 14) were formed on the surface 10 of the projections 12 by etching. Then, a resin material comprising nylon containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 5B

Example 5B is basically similar to Example 1B. However, a die (material: cemented carbide) pressed against a surface 10 of a metal piece (corresponding to the metal member 1) had pyramid-shaped convexities having a pitch between tops of 1000 μm and a depth of 400 μm. By using this die, a plurality of projections 12 were formed on the surface 10 of the metal piece (corresponding to the metal member 1). Pitch distance LA between top centers of adjoining projections 12 was 1000 μm, depth HA was 310 μm and inclination angle θ (see FIG. 1) was 60 deg. Then, fine pores (corresponding to the micro concave portions 14) were formed on the surface 10 of the projections 12 by etching. Then, a resin material comprising nylon containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 6B

Example 6B is basically similar to Example 1B. However, a die (material: cemented carbide) pressed against a surface 10 of a metal piece (corresponding to the metal member 1) had pyramid-shaped convexities having a pitch between tops of 200 µm and a depth of 67 µm. By using this die, a plurality of projections 12 were formed on the surface 10 of the metal piece (corresponding to the metal member 1). Pitch distance LA between top centers of adjoining projections 12 was 200 µm, depth HA was 50 µm and inclination angle θ (see FIG. 1) was 60 deg. Then, fine pores (corresponding to the micro concave portions 14) were formed on the surface 10 of the projections 12 by etching. Then, a resin material comprising nylon containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Comparative Example 1B

Comparative Example 1B is basically similar to Example 1B. However, projections were not formed and a die (material: cemented carbide) was not pressed against a surface 10 of a metal piece (corresponding to the metal member 1). In Comparative Example 1B, etching was applied to the surface 10 of the metal piece (corresponding to the metal member 1), thereby forming fine pores (corresponding to the micro concave portions 14) on the surface 10. The micro openings had opening sizes of not more than 3 µm (about 200 nm at minimum) and depths of about not more than 10 µm (about 200 nm at minimum). For etching, similarly to Examples 1, 1B, an etching solution used water as a solvent and contained 12 g/liter of OF-901 (produced by Ebara-Udylite Co., Ltd.) and 25 g/liter of magnesium hydroxide. Target temperature of the etching solution was 50 deg. C and etching time was 10 minutes. After the injection molding, the specimen was subjected to a thermal treatment in a high temperature bath at 120 deg. C for 24 hours, and then subjected to the evaluation test mentioned later.

Example 1C

Example 1C is basically similar to Example 1B. That is to say, a plurality of projections 12 were formed by pressing a die (material: cemented carbide) against a surface 10 of a metal piece (corresponding to the metal member 1) comprising a flat plate (an extruded aluminum material, JIS A5052) of 25 mm in width, 50 mm in length and 3 mm in thickness (see FIG. 1). The die had pyramid-shaped convexities having a pitch between tops of 100 µm and a depth of 67 µm. By using this die, the projections 12 were formed on the surface 10 of the metal piece (corresponding to the metal member 1). Pitch distance LA between top centers of adjoining projections 12 was 100 µm, depth HA was 50 µm and inclination angle θ was 60 deg. Herein, enterable spaces 13 were formed by the respective facing projections 12.

Next, etching was performed to form fine pores (corresponding to the micro concave portions 14) on the surface 10 of the projections 12. Micro openings of the fine pores faced the enterable spaces 13. The micro openings had opening sizes of not more than 3 µm (about 200 nm at minimum) and depths of not more than 10 µm (about 200 nm at minimum). Then, the metal piece was placed in a cavity of a die for injection molding. Then, a resin material comprising a PPS resin containing glass fibers was injected and molded in the cavity, thereby forming a specimen (see FIG. 23) comprising a composite molded article in which an FRP portion 3 having a thickness of 3 mm and the metal piece were integrated. An overlapping portion of the metal member and the FRP portion had a size of 5 mm×25 mm. For injection molding conditions, basically die temperature was 130 deg. C., cylinder temperature was 320 deg. C., injection pressure was 100 MPa, injection speed was 60 mm/sec, injection time was 1 second, and screw rotation speed was 100 rpm. After the injection molding, a pressure holding step was executed so as to keep applying pressure on the resin material charged in the cavity. This is advantageous in allowing the resin material to favorably enter the enterable spaces 13 between the projections 12 and the micro concave portions 14. In the pressure holding step, hold pressure was 50 MPa and pressure holding time was 10 seconds. Herein, the FRP portion 3 (glass fibers: 30% by mass) corresponds to the fiber-reinforced polymer material portion. The metal piece corresponds to the metal member 1. After the injection molding, the specimen was subjected to a thermal treatment in a high temperature bath at 120 deg. C. for 24 hours and then subjected to the evaluation test mentioned later.

Example 2C

Example 2C is basically similar to Example 1B. However, a die (material: cemented carbide) pressed against a surface 10 of a metal piece (corresponding to the metal member 1) had pyramid-shaped convexities having a pitch between tops of 200 µm and a depth of 133 µm. By using this die, a plurality of projections 12 were formed on the surface 10 of the metal piece (corresponding to the metal member 1). Pitch distance LA between top centers of adjoining projections 12 was 200 µm, depth HA was 100 µm and inclination angle θ (see FIG. 1) was 60 deg. Then, fine pores (corresponding to the micro concave portions 14) were formed on the surface 10 of the projections 12 by etching. Then, a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 3C

Example 3C is basically similar to Example 1B. However, a die (material: cemented carbide) pressed against a surface 10 of a metal piece (corresponding to the metal member 1) had pyramid-shaped convexities having a pitch between tops of 300 µm and a depth of 200 µm. By using this die, a plurality of projections 12 were formed on the surface 10 of the metal piece (corresponding to the metal member 1). Pitch distance LA between top centers of adjoining projections 12 was 300 µm, depth HA was 160 µm and inclination angle θ (see FIG. 1) was 60 deg. Then, fine pores (corresponding to the micro concave portions 14) were formed on the surface 10 of the projections 12 by etching. Then, a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 4C

Example 4C is basically similar to Example 1B. However, a die (material: cemented carbide) pressed against a surface 10 of a metal piece (corresponding to the metal member 1) had pyramid-shaped convexities having a pitch between tops of 600 μm and a depth of 400 μm. By using this die, a plurality of projections 12 were formed on the surface 10 of the metal piece (corresponding to the metal member 1). Pitch distance LA between top centers of adjoining projections 12 was 600 μm, depth HA was 300 μm and inclination angle θ (see FIG. 1) was 60 deg. Then, fine pores (corresponding to the micro concave portions 14) were formed on the surface 10 of the projections 12 by etching. Then, a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 5C

Example 5C is basically similar to Example 1B. However, a die (material: cemented carbide) pressed against a surface 10 of a metal piece (corresponding to the metal member 1) had pyramid-shaped convexities having a pitch between tops of 1000 μm and a depth of 400 μm. By using this die, a plurality of projections 12 were formed on the surface 10 of the metal piece (corresponding to the metal member 1). Pitch distance LA between top centers of adjoining projections 12 was 1000 μm, depth HA was 310 μm and inclination angle θ (see FIG. 1) was 60 deg. Then, fine pores (corresponding to the micro concave portions 14) were formed on the surface 10 of the projections 12 by etching. Then, a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Example 6C

Example 6C is basically similar to Example 1B. However, a die (material: cemented carbide) pressed against a surface 10 of a metal piece (corresponding to the metal member 1) had pyramid-shaped convexities having a pitch between tops of 200 μm and a depth of 67 μm. By using this die, a plurality of projections 12 were formed on the surface 10 of the metal piece (corresponding to the metal member 1). Pitch distance LA between top centers of adjoining projections 12 was 200 μm, depth HA was 50 μm and inclination angle θ (see FIG. 1) was 60 deg. Then, fine pores (corresponding to the micro concave portions 14) were formed on the surface 10 of the projections 12 by etching. Then, a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C. for 24 hours, and then subjected to the evaluation test mentioned later.

Comparative Example 1C

Comparative Example 1C is basically similar to Example 1C. However, projections were not formed and a die (material: cemented carbide) was not pressed against a surface 10 of a metal piece (corresponding to the metal member 1). In Comparative Example 1C, etching was applied to the surface 10 of the metal piece (corresponding to the metal member 1), thereby forming fine pores (corresponding to the micro concave portions 14) on the surface 10. Their micro openings had opening sizes of not more than 3 μm (about 200 nm at minimum) and depths of about not more than 10 μm (about 200 nm at minimum). Then a resin material comprising a PPS resin containing glass fibers was injected and molded in a cavity, thereby forming a specimen (see FIG. 23) comprising a composite molded article in which an FRP portion 3 having a thickness of 3 mm and the metal piece were integrated. After the injection molding, the specimen was subjected to a thermal treatment in a high temperature bath at 120 deg. C for 24 hours, and then subjected to the evaluation test mentioned later.

Example 1D

Example 1D is basically similar to Example 1. A rough surface was formed by blasting on a surface 10 of a metal piece (corresponding to the metal member 1) comprising a flat plate of the same kind as that of Example 1 (an extruded aluminum material). The rough surface had an average roughness of 100 to 120 z (Rz). A plurality of projections 12 were randomly juxtaposed on the rough surface. Pitch distance LA between tops of adjoining projections 12 was basically not less than 80 to 150 μm and depth HA was basically about 50 to 100 μm. Next, etching was performed to form fine pores (corresponding to the micro convex portions 14) on the surface 10 of the projections 12. Their micro openings had opening sizes of not more than 3 μm and depths of not more than 10 μm. Then a PPS resin containing glass fibers was injected and molded. Thus obtained was a specimen (see FIG. 20) comprising a composite molded article in which an FRP portion 3 having a thickness of 3 mm and the metal piece were integrated.

[Evaluation Test]

Initial shear strength of an interface of each of the above-mentioned specimens (see FIG. 23) of Examples 1B to 6B, 1C to 6C, Comparative Example 1D, and Example 1D was obtained by pulling the specimen in the direction of F (a longitudinal direction) in FIG. 20 in order to apply shear force to the interface of the specimen. After each of the specimens was subjected to a thermal shock test in which thermal shock was repeatedly applied on the specimen by repeating a thermal cycle, shear strength of the specimen after the thermal shock was obtained. One thermal cycle consisted of one hour duration at 150 deg. C. and one hour duration at −40 deg. C., and 100 cycles were executed. Test results about initial shear strength, shear strength after thermal shock and retention rate are shown in Table 3 and FIG. 24. Herein, initial shear strength means shear strength before subjected to the thermal shock test. Retention rate (%) indicates (shear strength after thermal shock/initial shear strength)×100 (%). A high retention rate means that shear strength after thermal shock is maintained.

resin. It is believed that if tough engineer plastic other than PPS is used, a high retention rate can be obtained even when pitch distance LA is 10 to 3000 μm.

TABLE 3

|  | EX. | | | | | | COMP. EX. | EX. | | | | | | COMP. EX. | EX. |
| --- | --- | --- | --- | --- | --- | --- | --- | --- | --- | --- | --- | --- | --- | --- | --- |
|  | 1B | 2B | 3B | 4B | 5B | 6B | 1B | 1C | 2C | 3C | 4C | 5C | 6C | 1C | 1D |
| TECHNIQUE | DIE IMPRINTING | | | | | | | | | | | | | | SHOT BLAST |
| PITCH LA (μm) | 100 | 200 | 300 | 600 | 1000 | 200 | 0 | 100 | 200 | 300 | 600 | 1000 | 200 | 0 | Rz 110 |
| DEPTH HA (μm) | 50 | 100 | 166 | 300 | 310 | 50 | 0 | 50 | 100 | 160 | 300 | 310 | 50 | 0 |  |
| DIAMETER OF FINE PORES (μm) | <3 | <3 | <3 | <3 | <3 | <3 | <3 | <3 | <3 | <3 | <3 | <3 | <3 | <3 | <3 |
| DEPTH OF FINE PORES (μm) | <10 | <10 | <10 | <10 | <10 | <10 | <10 | <10 | <10 | <10 | <10 | <10 | <10 | <10 | <10 |
| COMBINATION | Al/PA | Al/PA | Al/PA | Al/PA | Al/PA | Al/PA | Al/PA | Al/PPS | Al/PPS | Al/PPS | Al/PPS | Al/PPS | Al/PPS | Al/PPS | Al/PPS |
| INITIAL SHEAR STRENGTH (MPa) | 14.9 | 15.5 | 15.6 | 15.8 | 15.3 | 14.8 | 14.3 | 25.3 | 26.4 | 27.1 | 26.9 | 26.0 | 24.6 | 24.3 | 28.1 |
| SEHAR STRENGTH AFTER THERMAL SHOCK (MPa) | 14.8 | 15.3 | 13.9 | 8.2 | 1.3 | 8.3 | 2.3 | 25.4 | 26.2 | 26.7 | 22.6 | 17.3 | 20.1 | 12.2 | 19.3 |

Figure 24:
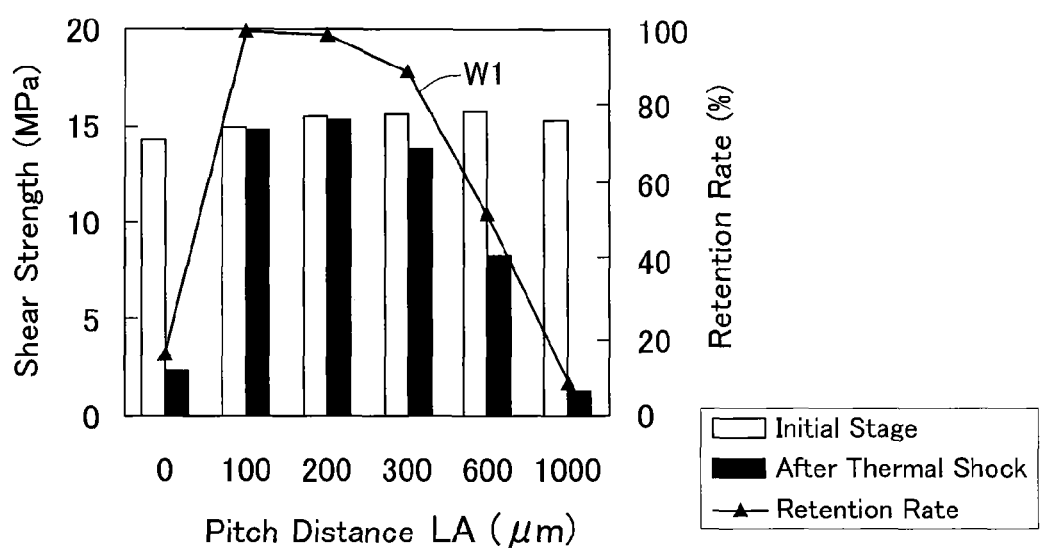
FIG. 24 is a graph showing a relation between projection pitch distance on the horizontal axis and shear strength and retention rate (%) on the vertical axis when an FRP portion of a specimen is formed of nylon containing glass fibers.

As shown in Table 3, even in Examples 1B to 6B formed by injecting molding nylon (polyamide, PA) containing glass fibers, initial shear strength was good and had no big variation. However, shear strength after thermal shock was easily influenced by the pitch distance LA between the projections 12. Moreover, as shown in Table 3, in Examples 1C to 6C formed by injection molding the PPS resin (a kind of engineering plastic), initial shear strength was good and shear strength even after thermal shock was not less than 17 MPa, which was good, even though influenced by the pitch distance LA between the projections 12. In Example 1D (having Rz 110) subjected to shot blasting, initial shear strength was good and shear strength even after thermal shock was not less than 19.3 MPa, which was good. It is believed that Rz 110 corresponds to a pitch distance between the projections of 50 to 1000 μm. Rz means 10-point average roughness. FIG. 24 shows test results of Examples 1B to 6B formed by injection molding nylon containing glass fibers. The characteristic line W1 shows retention rate. As can be understood from FIG. 24, pitch distance LA between tops of adjoining projections 12 shows a bell curve in a certain range. In the case of the specimens formed by injection molding nylon containing glass fibers, pitch distance LA of 60 to 700 μm is effective to obtain a retention rate of not less than 40%. Pitch distance LA of 80 to 650 μm is effective to obtain a retention rate of not less than 60%. Pitch distance LA of 90 to 550 μm is effective to obtain a retention rate of not less than 70%.

Figure 25:
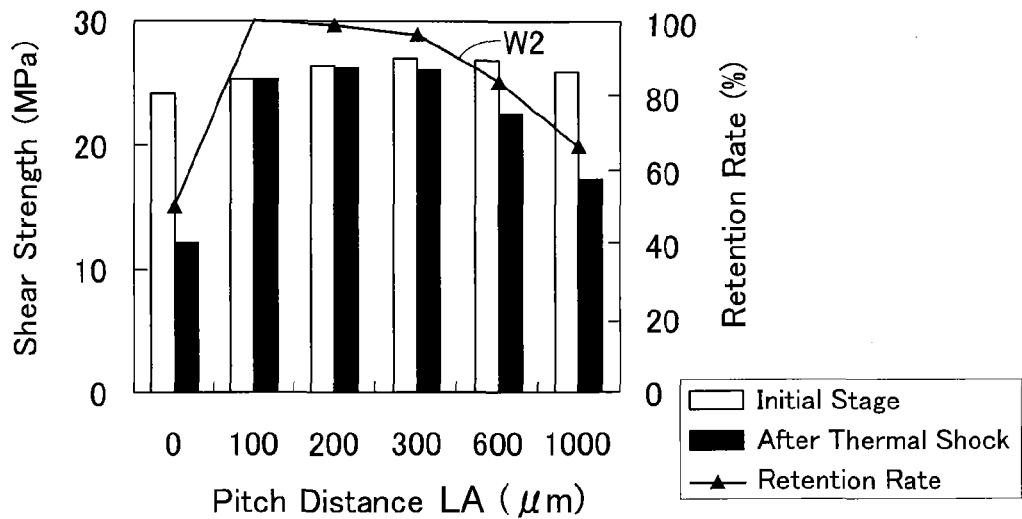
FIG. 25 is a graph showing a relation between projection pitch distance on the horizontal axis and shear strength and retention rate (%) on the vertical axis when an FRP portion of a specimen is formed of a PPS resin containing glass fibers.
Figure 26:
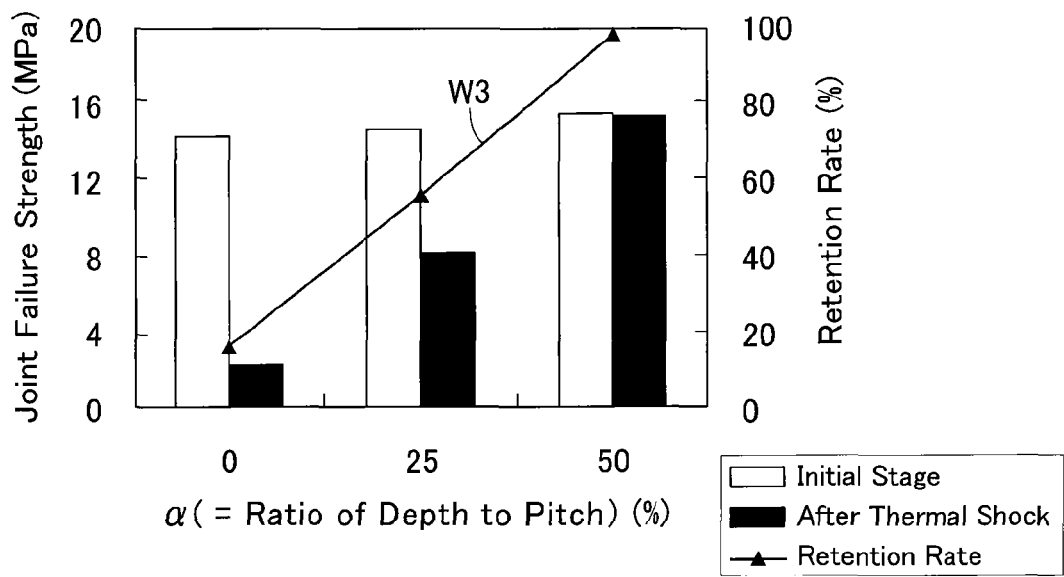
FIG. 26 is a graph showing a relation between a regarding a ratio of enterable space depth to projection pitch distance on the horizontal axis and joint breaking strength and retention rate (%) on the horizontal axis.

FIG. 25 shows test results of Examples 1C to 6C, which are resin sheets formed by injection molding the resin material comprising the PPS resin containing glass fibers. The characteristic line W2 shows retention rate. As can be understood from FIG. 25, pitch distance LA between tops of adjoining projections 12 show a bell curve in a certain range. In the case of the specimens formed by injection molding the PPS resin containing glass fibers, pitch distance LA of about 50 to 1500 μm is effective to obtain a retention rate of not less than 50%. Pitch distance LA of about 60 to 1200 μm is effective to obtain a retention rate of not less than 60%. Pitch distance LA of about 90 to 1000 μm is effective to obtain a retention rate of not less than 70%. Pitch distance LA of 90 to 650 μm is effective to obtain a retention rate of not less than 80%. Thus the retention rate is greatly influenced by the material of the Furthermore, how much the value of (depth of the enterable spaces 13/pitch distance LA between the projections 12) influences joint failure strength was evaluated based on the abovementioned test results. FIG. 26 shows evaluation results. Depth corresponds to height of the projections 12. The characteristic line W3 shows retention rate. The horizontal axis of FIG. 26 shows α, i.e., [depth of enterable spaces (μm)/pitch distance LA between projections (μm)]×100%. The vertical axis of FIG. 26 shows joint failure strength. As can be understood from FIG. 26, as α is greater, joint failure strength after thermal shock is greater and retention rate is also higher. It is apparent from this that as α, which relates to (depth of the enterable spaces 13/pitch distance), is greater, joint failure strength after thermal shock is greater and retention rate is also higher. As shown in FIG. 26, when α is 50%, joint failure strength after thermal shock is a value substantially corresponding to initial joint failure strength. Hence, it is preferable that α is not less than 30%, not less than 40%, or not less than 50%.

(Others) An aluminum alloy can be a wrought alloy or a cast alloy, and can have a hypoeutectic, eutectic or hypereutectic composition. The same applies to a magnesium alloy. The present invention is not limited to the embodiments and the examples described above and shown in the drawings but can be embodied with appropriate modifications without departing from the spirit of the present invention. The structures and production methods characteristic to the abovementioned embodiments and examples are basically applicable to other embodiments and other examples.

The following technical ideas can also be grasped from the foregoing description.

[Appendix 1] A method for producing a composite molded article comprising a step of preparing a fiber-reinforced polymer material having a polymer material as a matrix and a plurality of reinforcing fibers for reinforcing the matrix, and a metal member using metal as a base material and having a surface; a step of juxtaposing a plurality of projections regularly or randomly on the surface of the metal member at a pitch distance greater than diameters of the reinforcing fibers so as to form, on the surface of the metal member, enterable spaces which part of the polymer material constituting the matrix of the fiber-reinforced polymer material portion enters and at least part of the reinforcing fibers can enter; a step of forming a composite molded article by coating the fiber-reinforced polymer material on a portion of the surface of the metal member on which the projections are formed. According to this method, in the composite molded article, part of the polymer material constituting the matrix of the fiber-reinforced polymer material enters the enterable spaces and at least part of the reinforcing fibers can enter the enterable spaces.

[Appendix 2] A method for producing a composite molded article comprising a step of preparing a fiber-reinforced polymer material having a polymer material as a matrix and a plurality of reinforcing fibers for reinforcing the matrix, and a metal member using metal as a base material and having a surface; a step of juxtaposing a plurality of projections regularly or randomly on the surface of the metal member at a pitch distance greater than diameters of the reinforcing fibers so as to form, on the surface of the metal member, enterable spaces which part of the polymer material constituting the fiber-reinforced polymer material portion enters and at least part of the reinforcing fibers can enter, and forming a plurality of micro concave portions and/or micro convex portions on wall surfaces of the projections so as to be exposed to the enterable spaces between the respective facing projections; a step of forming a composite molded article by coating the fiber-reinforced polymer material on a portion of the surface of the metal member on which the projections are formed. According to this method, in the composite molded article, part of the polymer material constituting the matrix of the fiber-reinforced polymer material enters the enterable spaces and at least part of the reinforcing fibers can enter the enterable spaces. Furthermore, since the micro concave portions and/or the micro convex portions are formed on the wall surfaces of the projections, degree of engagement and peel resistance of the fiber-reinforced polymer material portion can be increased.

[Appendix 3] A composite molded article comprising a metal member using metal as a base material and having a surface, and a fiber-reinforced polymer material portion coated on at least part of the surface of the metal member and having a polymer material as a matrix and a plurality of reinforcing fibers for reinforcing the matrix, the surface of the metal member having a plurality of projections juxtaposed regularly or randomly at a predetermined pitch distance LA.

[Appendix 4] A composite molded article comprising a metal member using metal as a base material and having a surface, and a fiber-reinforced polymer material portion coated on at least part of the surface of the metal member and having a polymer material as a matrix and a plurality of reinforcing fibers for reinforcing the matrix, the surface of the metal member having a plurality of projections juxtaposed regularly or randomly at a predetermined pitch distance, the respective facing projections forming enterable spaces which part of the polymer material constituting the fiber-reinforced polymer material portion enters, and wall surfaces forming the projections having a plurality of micro concave portions and/or micro convex portions exposed to the enterable spaces.

INDUSTRIAL APPLICABILITY

The present invention can be used for components to be mounted in an atmosphere with a high thermal impact where heating and cooling are repeated. For example, the present invention can be used for components to be mounted in engine rooms, motor rooms, battery rooms or the like of vehicles.

The invention claimed is:
1. A composite molded article, comprising:
a metal member using metal as a base material and having a surface; and
a fiber-reinforced polymer material portion coated on at least part of the surface of the metal member and having a polymer material as a matrix and a plurality of reinforcing fibers for reinforcing the matrix;
the surface of the metal member having a plurality of projections juxtaposed regularly or randomly at a pitch distance greater than diameters of the reinforcing fibers and the respective facing projections forming enterable spaces which part of the polymer material constituting the fiber-reinforced polymer material portion enters and at least part of the reinforcing fibers can enter,
the pitch distance being within a range of 30 to 2000 µm, and the projections being connected with each other in a plan view taken in a perpendicular direction to the surface of the metal member, and
a depth of the enterable spaces is set to be the pitch distance times a range of 0.7 to 1.7.

2. The composite molded article according to claim 1, wherein wall surfaces forming the projections have a plurality of micro concave portions and/or micro convex portions exposed to the enterable spaces.

3. The composite molded article according to claim 1, wherein the enterable spaces and the projections are formed of an imprinted surface formed on the surface of the metal member.

4. The composite molded article according to claim 1, wherein the enterable spaces and the projections are formed of a surface blasted by making a group of blast media hit the surface of the metal member.

5. The composite molded article according to claim 1, wherein $\alpha$ is not less than 20%, where $\alpha$ is [the depth of the enterable spaces (µm)/the pitch distance LA (µm) between the projections]×100%.

6. The composite molded article according to claim 1, wherein the metal constituting the metal member is at least one kind of aluminum, aluminum alloys, magnesium, magnesium alloys, iron, iron alloys, titanium, titanium alloys, copper, and copper alloys,
the polymer material constituting the fiber-reinforced polymer material portion is at least one kind of nylon, polyimide, polyacetal, polyethylene terephthalate (PET), polybutylene terephthalate (PBT), polyphenylene sulfide (PPS), polyether sulfone (PES), polyether imide (PEI), polyphenylene ether (PPE), polysulfone, polyethylene, polystyrene, polypropylene, acrylic resin, vinyl chloride resin, fluorocarbon resin, polycarbonate, phenol resin, epoxy resin, unsaturated polyester resin, acrylonitrile butadiene styrene (ABS), acrylonitrile butadiene (AB), and liquid crystal polymer, and
the reinforcing fibers constituting the fiber-reinforced polymer material portion are at least one kind of glass fibers, ceramic fibers, metal fibers, carbon fibers, and high-strength polymer fibers.

7. The composite molded article according to claim 1, wherein the polymer material constituting the fiber-reinforced polymer material portion is a nylon-based resin and the pitch distance is within a range of 50 to 700 µm.

8. The composite molded article according to claim 1, wherein the polymer material constituting the fiber-reinforced polymer material portion is a polyphenylene sulfide (PPS)-based resin and the pitch distance is within a range of 50 to 1000 µm.

9. A composite molded article, comprising:
a metal member using metal as a base material and having a surface; and
a fiber-reinforced polymer material portion coated on at least part of the surface of the metal member and having a polymer material as a matrix and a plurality of reinforcing fibers for reinforcing the matrix;
the surface of the metal member having a plurality of projections juxtaposed regularly or randomly at a pitch distance greater than diameters of the reinforcing fibers and the respective facing projections forming enterable spaces which part of the polymer material constituting the fiber-reinforced polymer material portion enters and at least part of the reinforcing fibers can enter,
the pitch distance being within a range of 30 to 2000 µm, and the projections being connected with each other in a plan view taken in a perpendicular direction to the surface of the metal member,
wherein in the plan view the enterable spaces have a quadrangular shape in accordance with the projections being connected with each other in the plan view taken in the perpendicular direction to the surface of the metal member.

10. The composite molded article according to claim 9, wherein wall surfaces forming the projections have a plurality of micro concave portions and/or micro convex portions exposed to the enterable spaces.

11. The composite molded article according to claim 9, wherein the enterable spaces and the projections are formed of an imprinted surface formed on the surface of the metal member.

12. The composite molded article according to claim 9, wherein the enterable spaces and the projections are formed of a surface blasted by making a group of blast media hit the surface of the metal member.

13. The composite molded article according to claim 1, wherein $\alpha$ is not less than 20%, where $\alpha$ is [a depth of the enterable spaces (µm) / the pitch distance LA (µm) between the projections]×100%.

14. The composite molded article according to claim 9, wherein the metal constituting the metal member is at least one kind of aluminum, aluminum alloys, magnesium, magnesium alloys, iron, iron alloys, titanium, titanium alloys, copper, and copper alloys,
the polymer material constituting the fiber-reinforced polymer material portion is at least one kind of nylon, polyimide, polyacetal, polyethylene terephthalate (PET), polybutylene terephthalate (PBT), polyphenylene sulfide (PPS), polyether sulfone (PES), polyether imide (PEI), polyphenylene ether (PPE), polysulfone, polyethylene, polystyrene, polypropylene, acrylic resin, vinyl chloride resin, fluorocarbon resin, polycarbonate, phenol resin, epoxy resin, unsaturated polyester resin, acrylonitrile butadiene styrene (ABS), acrylonitrile butadiene (AB), and liquid crystal polymer, and
the reinforcing fibers constituting the fiber-reinforced polymer material portion are at least one kind of glass fibers, ceramic fibers, metal fibers, carbon fibers, and high-strength polymer fibers.

15. The composite molded article according to claim 9, wherein the polymer material constituting the fiber-reinforced polymer material portion is a nylon-based resin and the pitch distance is within a range of 50 to 700 µm.

16. The composite molded article according to claim 9, wherein the polymer material constituting the fiber-reinforced polymer material portion is a polyphenylene sulfide (PPS)-based resin and the pitch distance is within a range of 50 to 1000 µm.

* * * * *